Figures 6, 7:
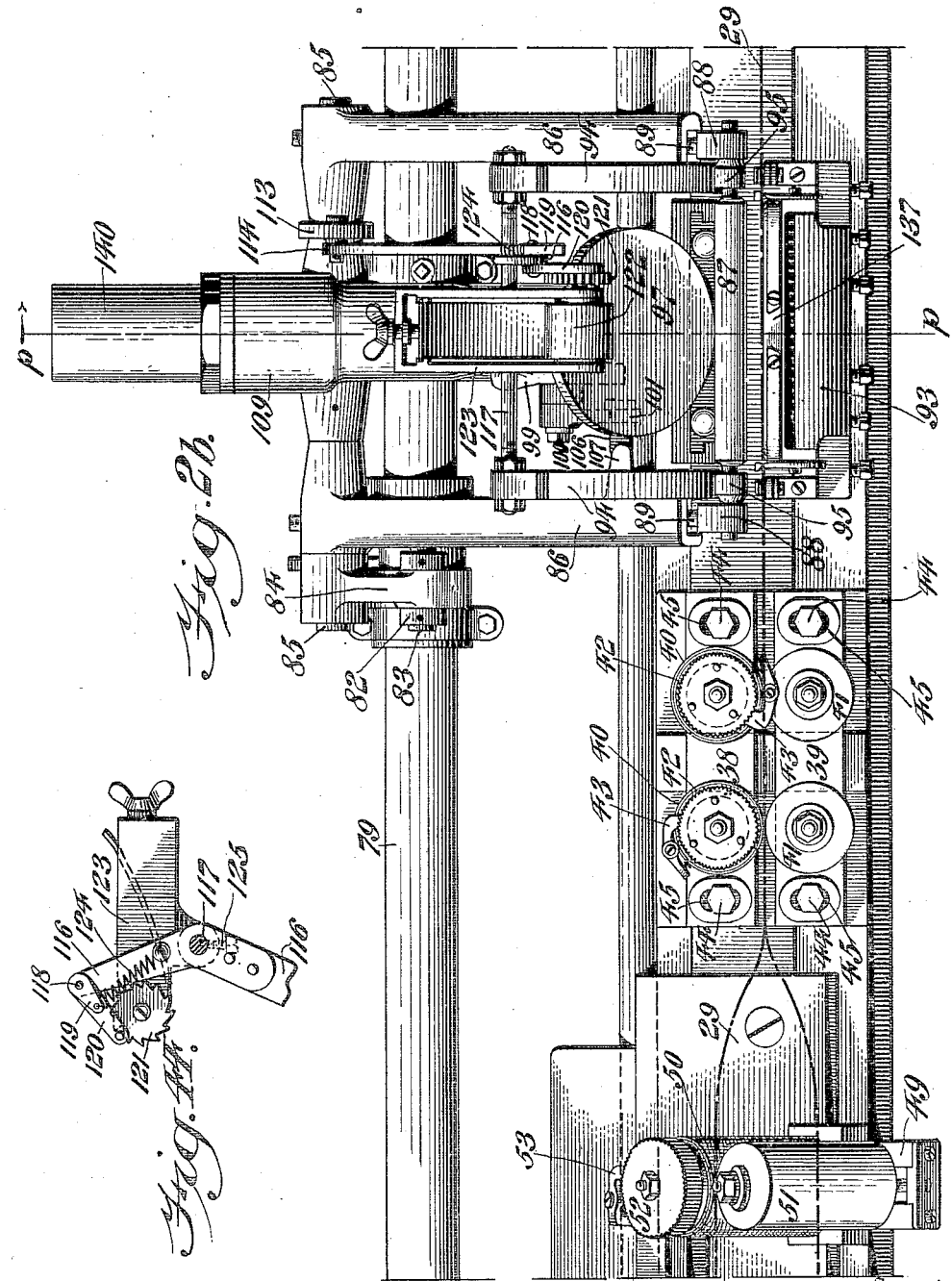

H. L. ROTH.
TAG MACHINE.
APPLICATION FILED MAY 8, 1909.
971,927.
Patented Oct. 4, 1910.
17 SHEETS—SHEET 1.
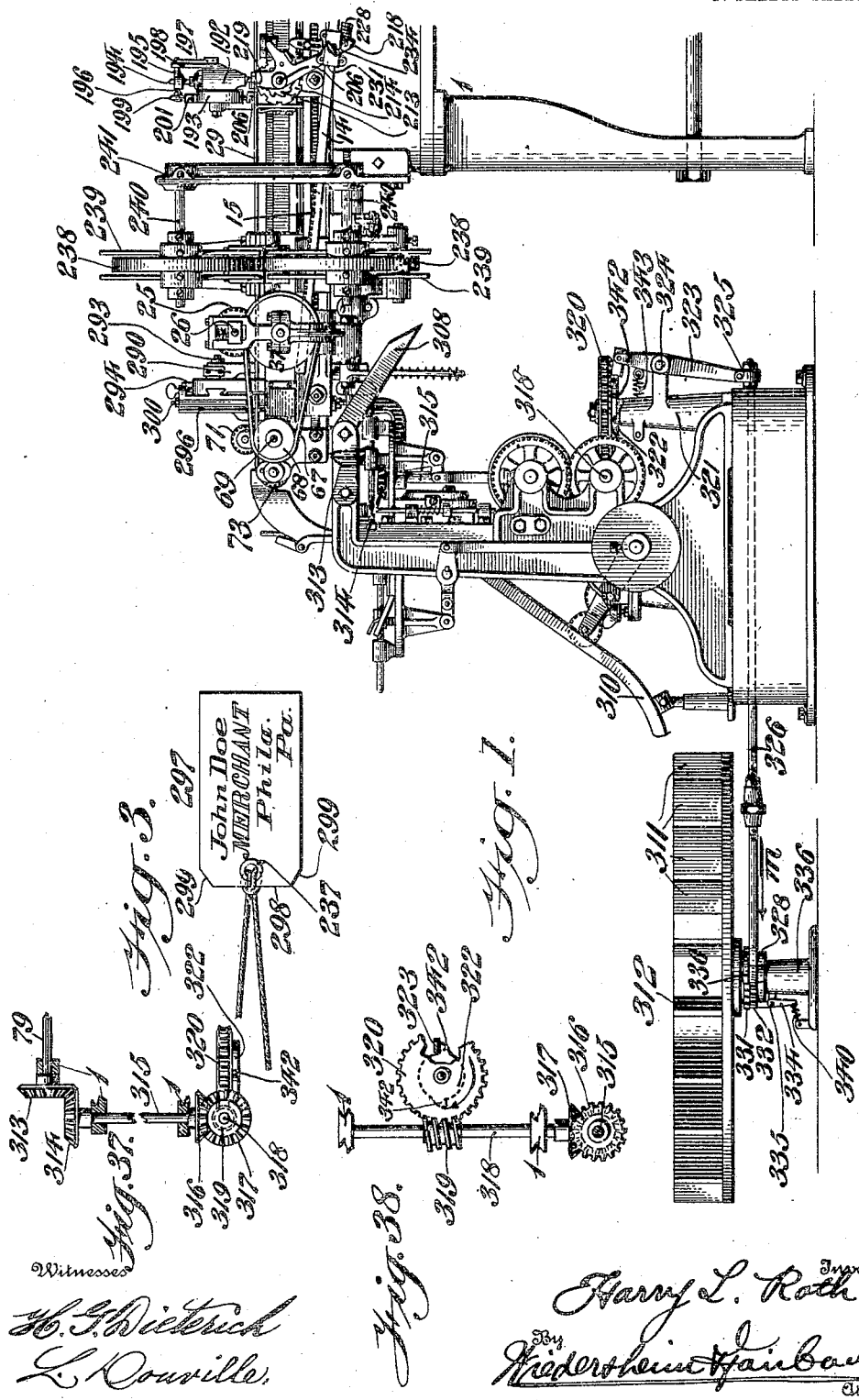

H. L. ROTH.
TAG MACHINE.
APPLICATION FILED MAY 8, 1909.
971,927.
Patented Oct. 4, 1910.
17 SHEETS—SHEET 2.
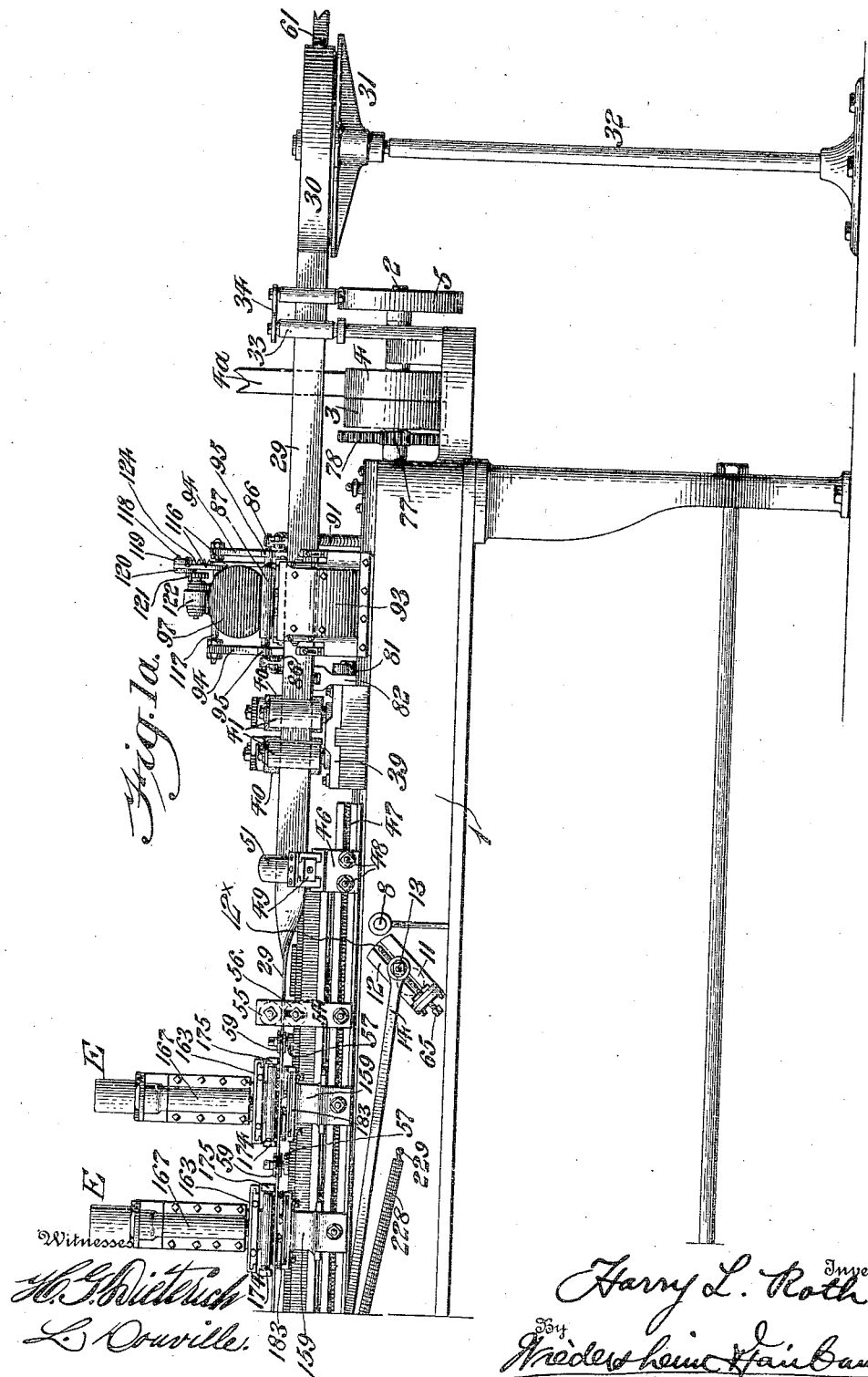

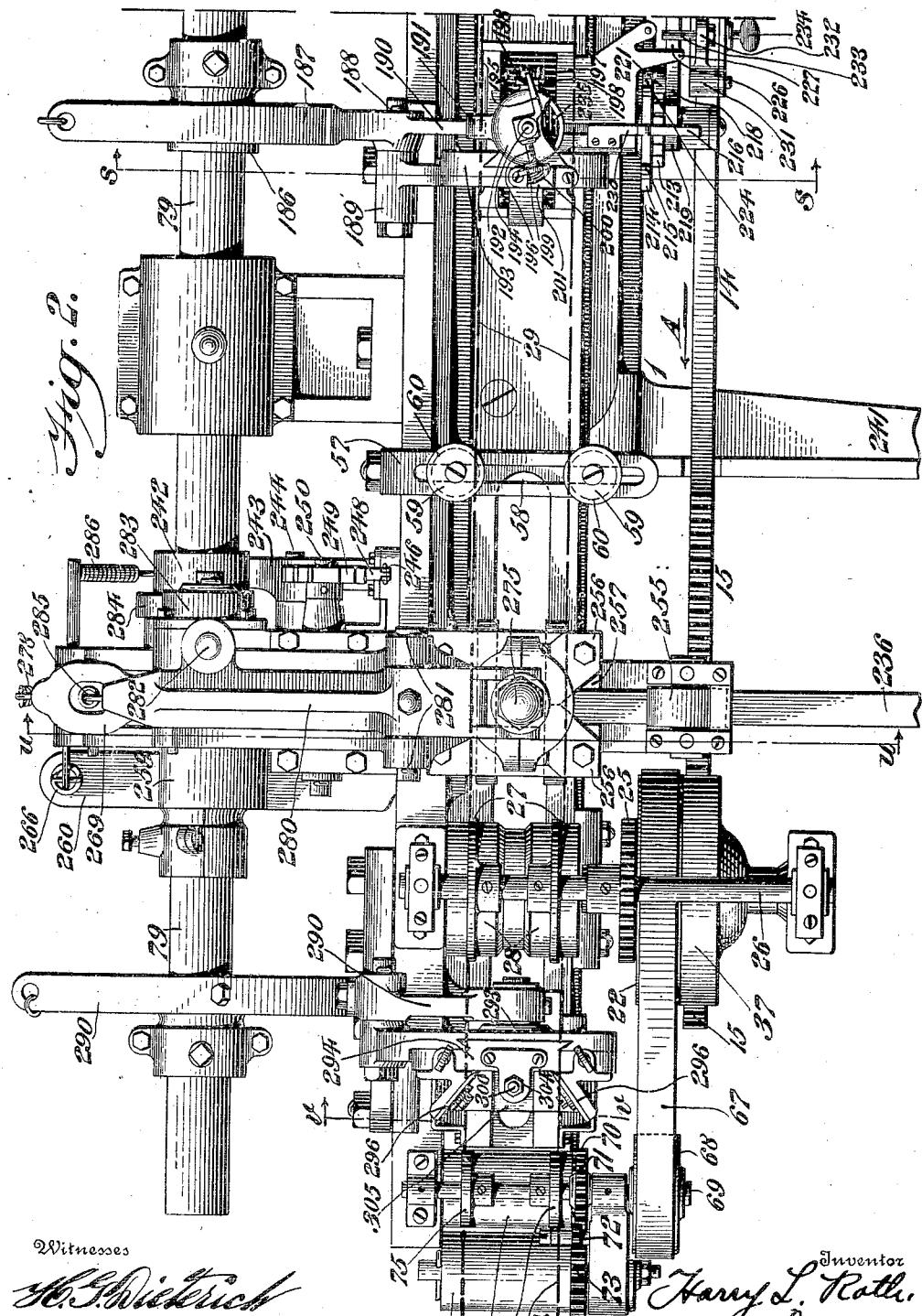

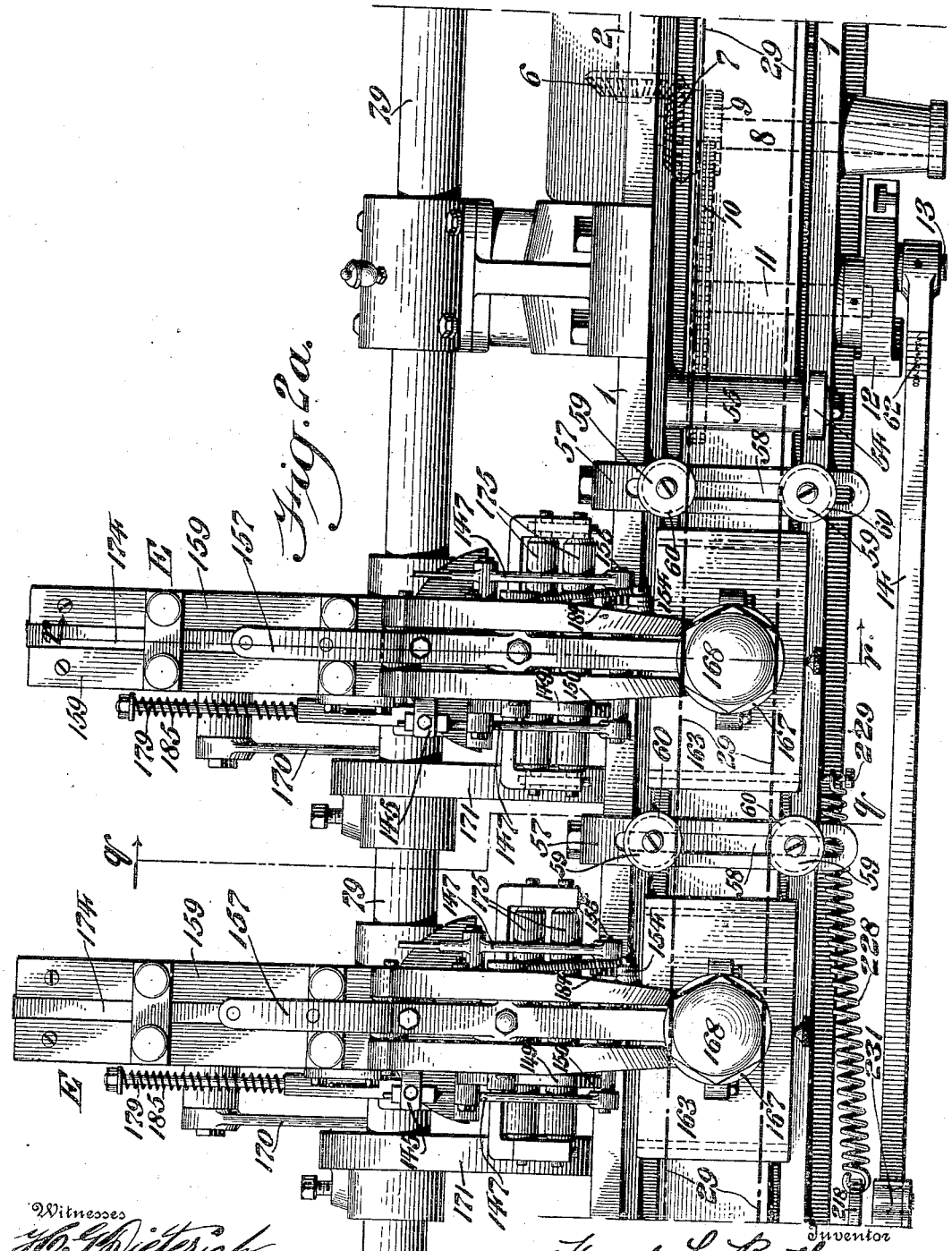

H. L. ROTH.
TAG MACHINE.
APPLICATION FILED MAY 8, 1909.

971,927.

Patented Oct. 4, 1910.
17 SHEETS—SHEET 5.

Witnesses
H. Dieterich
L. Donville

Inventor
Harry L. Roth.
By Wiederstein Fairbanks
Attorneys

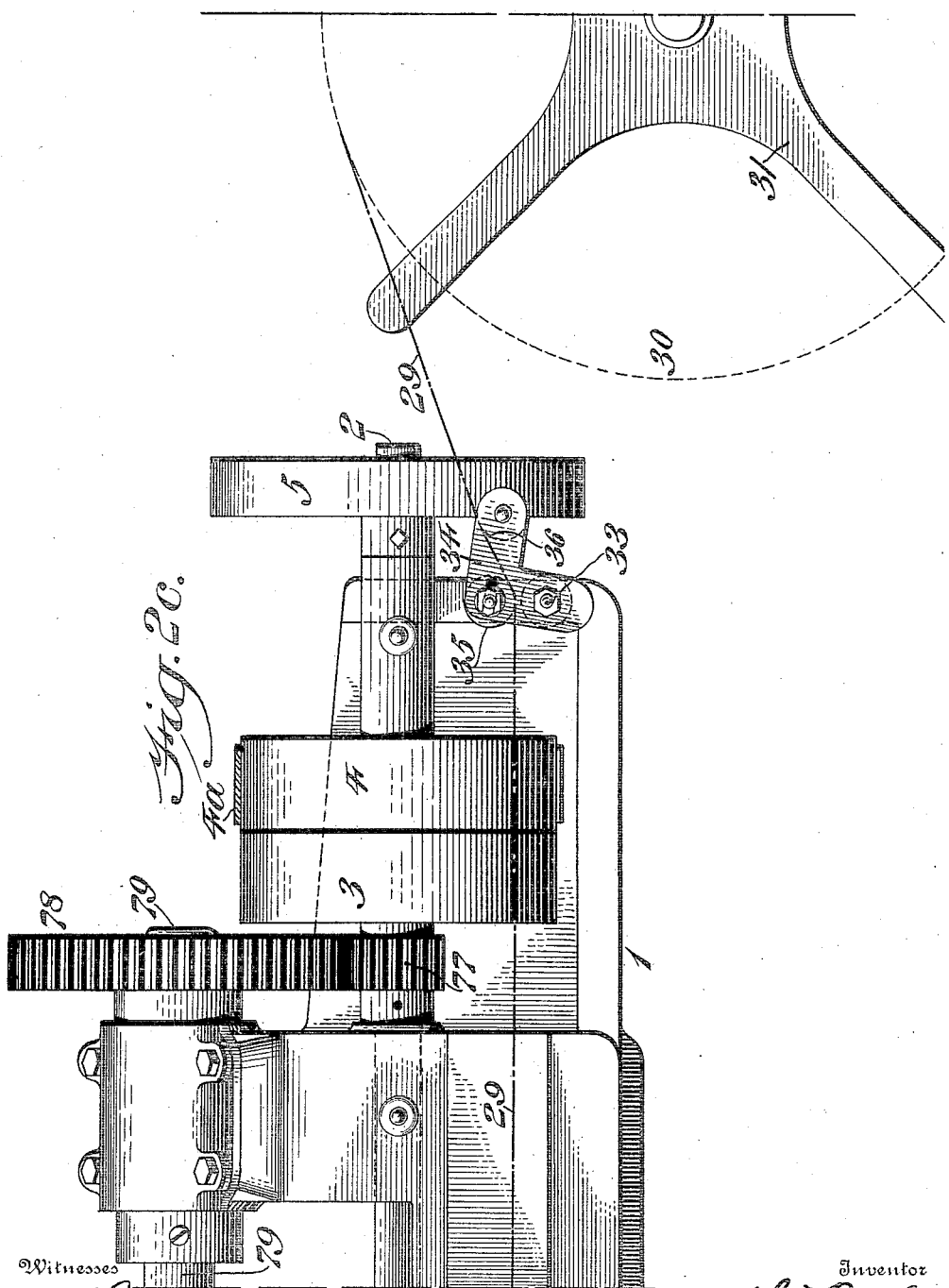

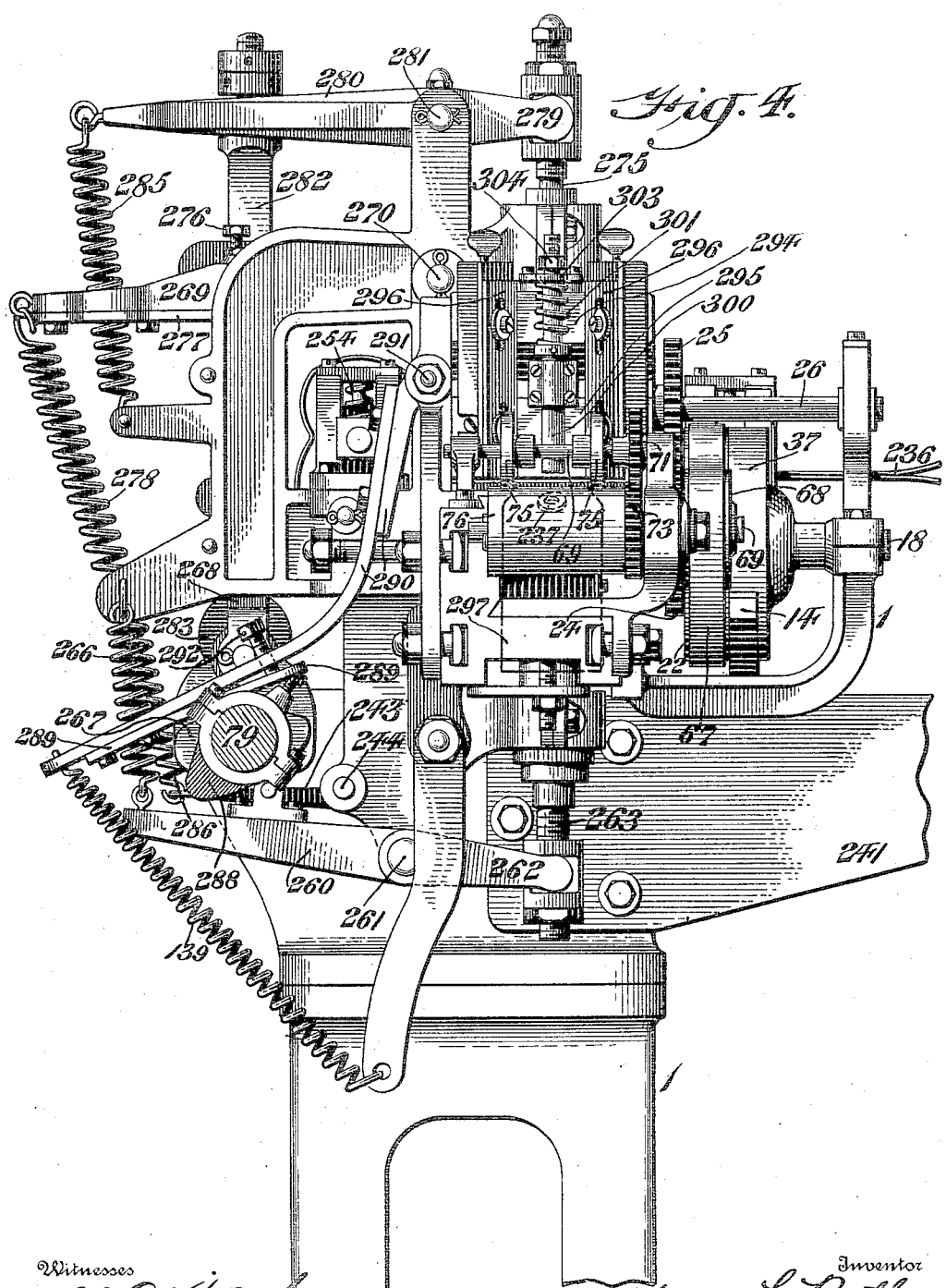

H. L. ROTH.
TAG MACHINE.
APPLICATION FILED MAY 8, 1909.
971,927.
Patented Oct. 4, 1910.
17 SHEETS—SHEET 8.
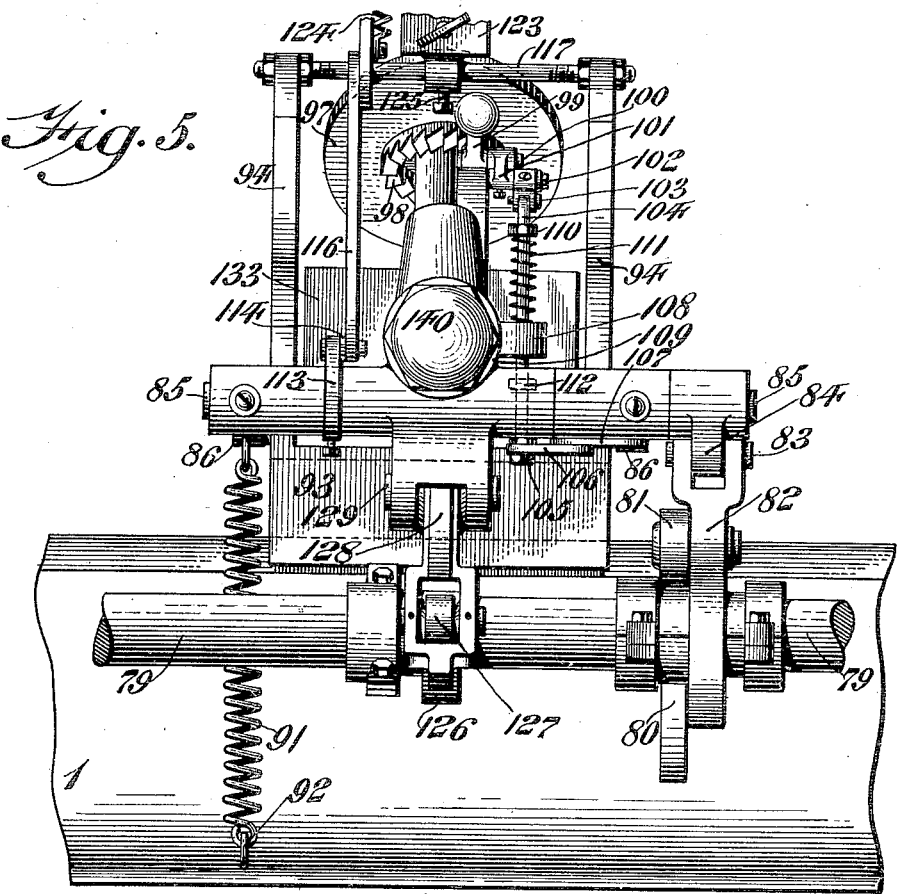
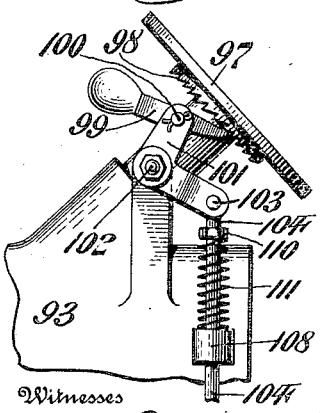
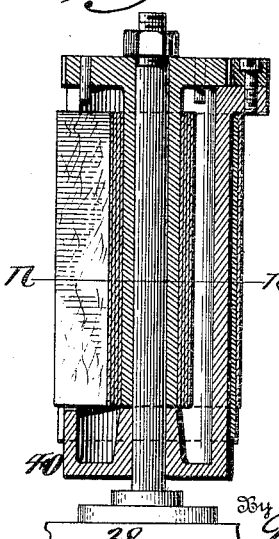
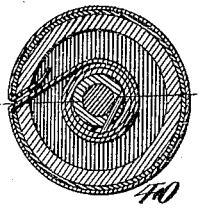
Witnesses
H. S. Dittrich
L. Douville
Inventor
Harry L. Roth.
By Wiedersheim & Fairbanks
Attorneys

H. L. ROTH.
TAG MACHINE.
APPLICATION FILED MAY 8, 1909.

971,927.

Patented Oct. 4, 1910.
17 SHEETS—SHEET 9.

Witnesses
Inventor
Harry L. Roth.

H. L. ROTH.
TAG MACHINE.
APPLICATION FILED MAY 8, 1909.
971,927.
Patented Oct. 4, 1910.
17 SHEETS—SHEET 10.
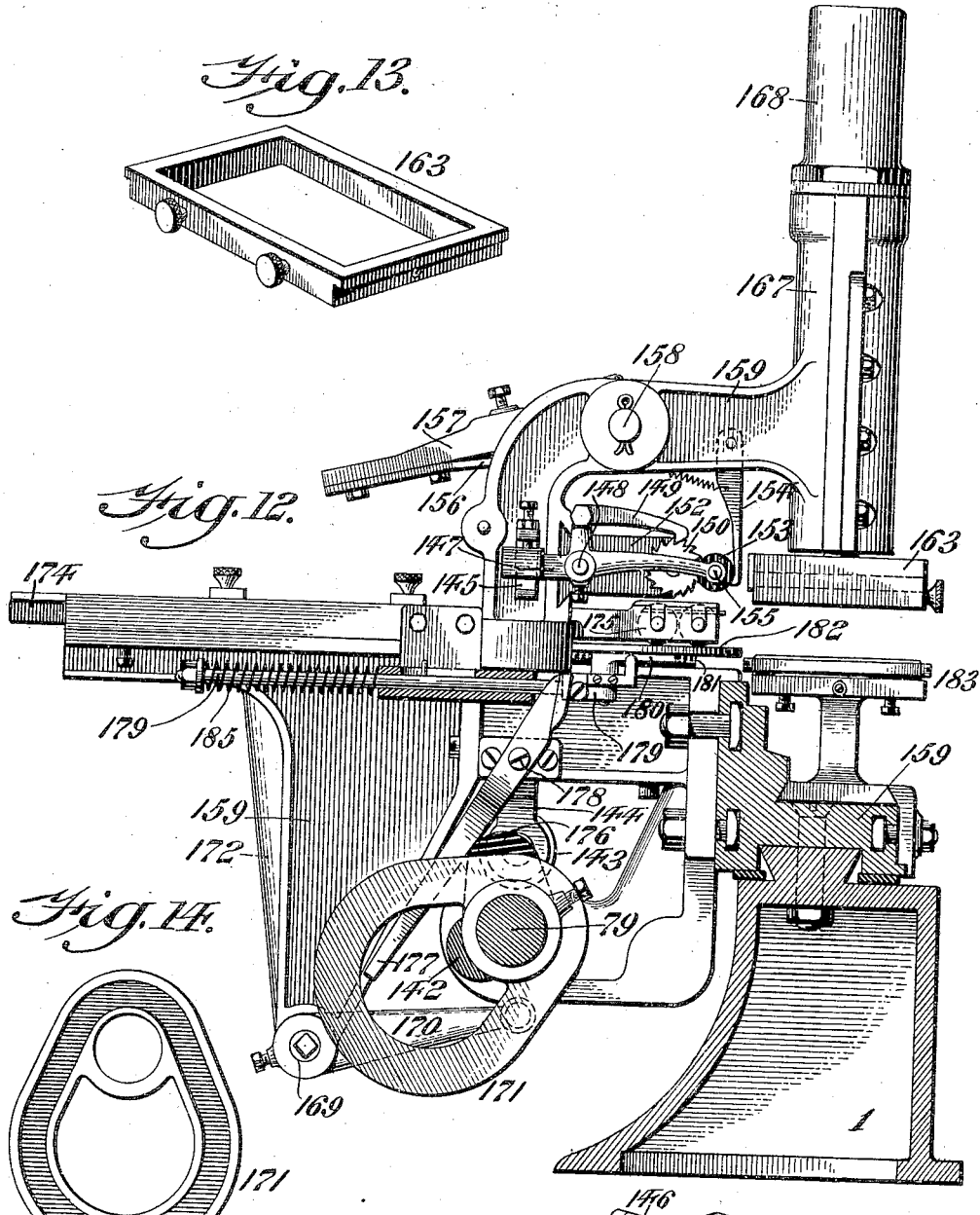

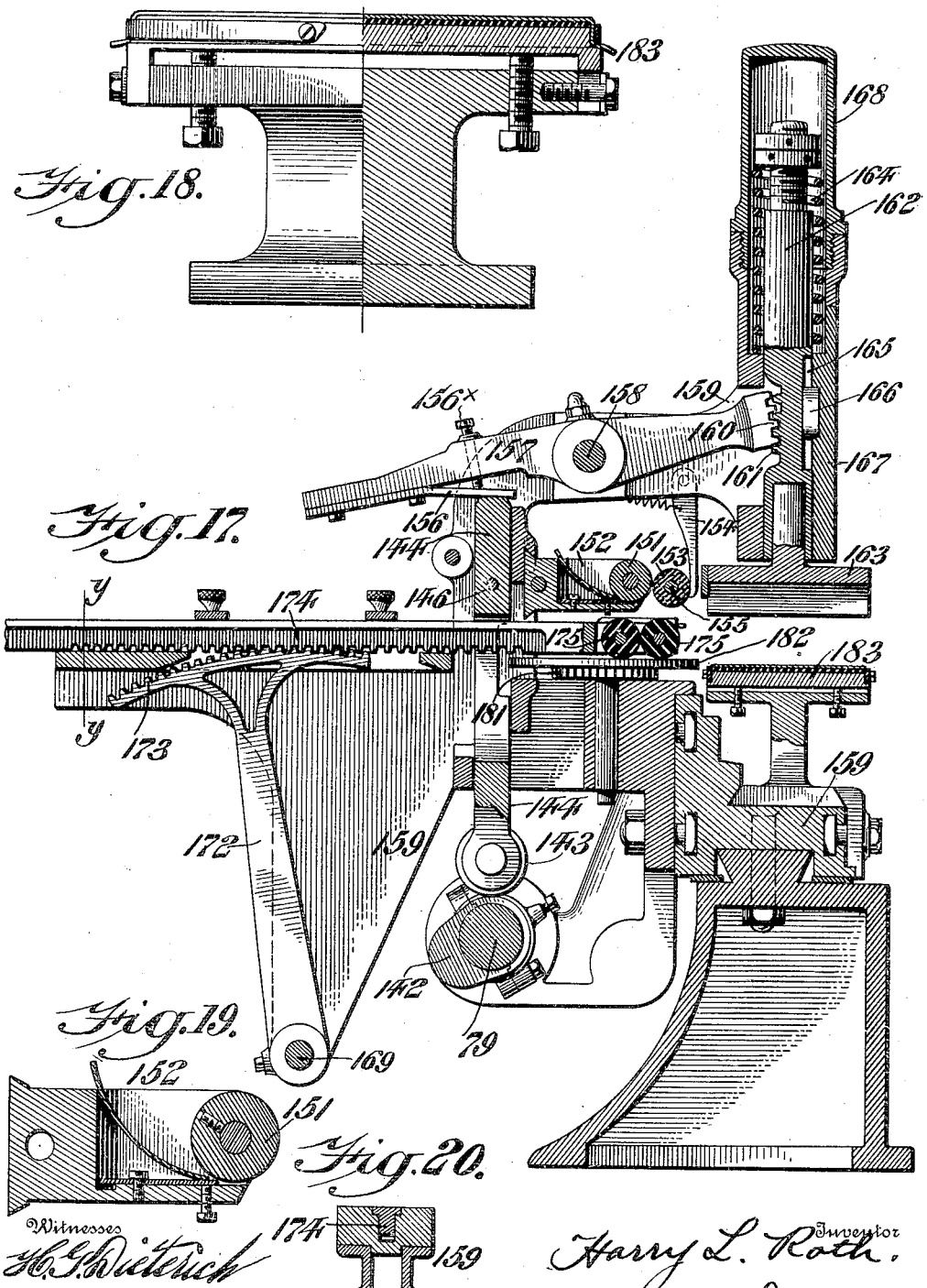

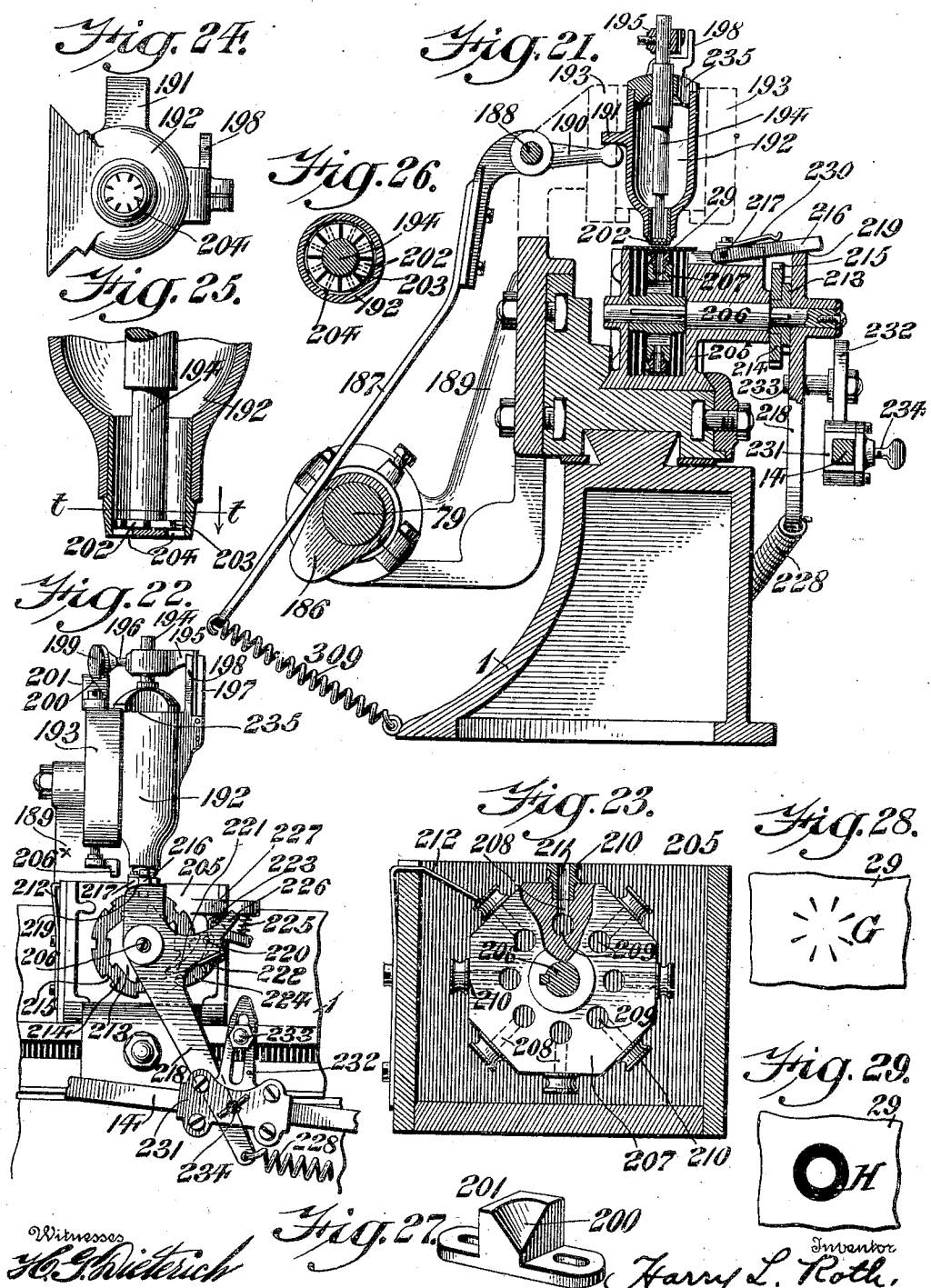

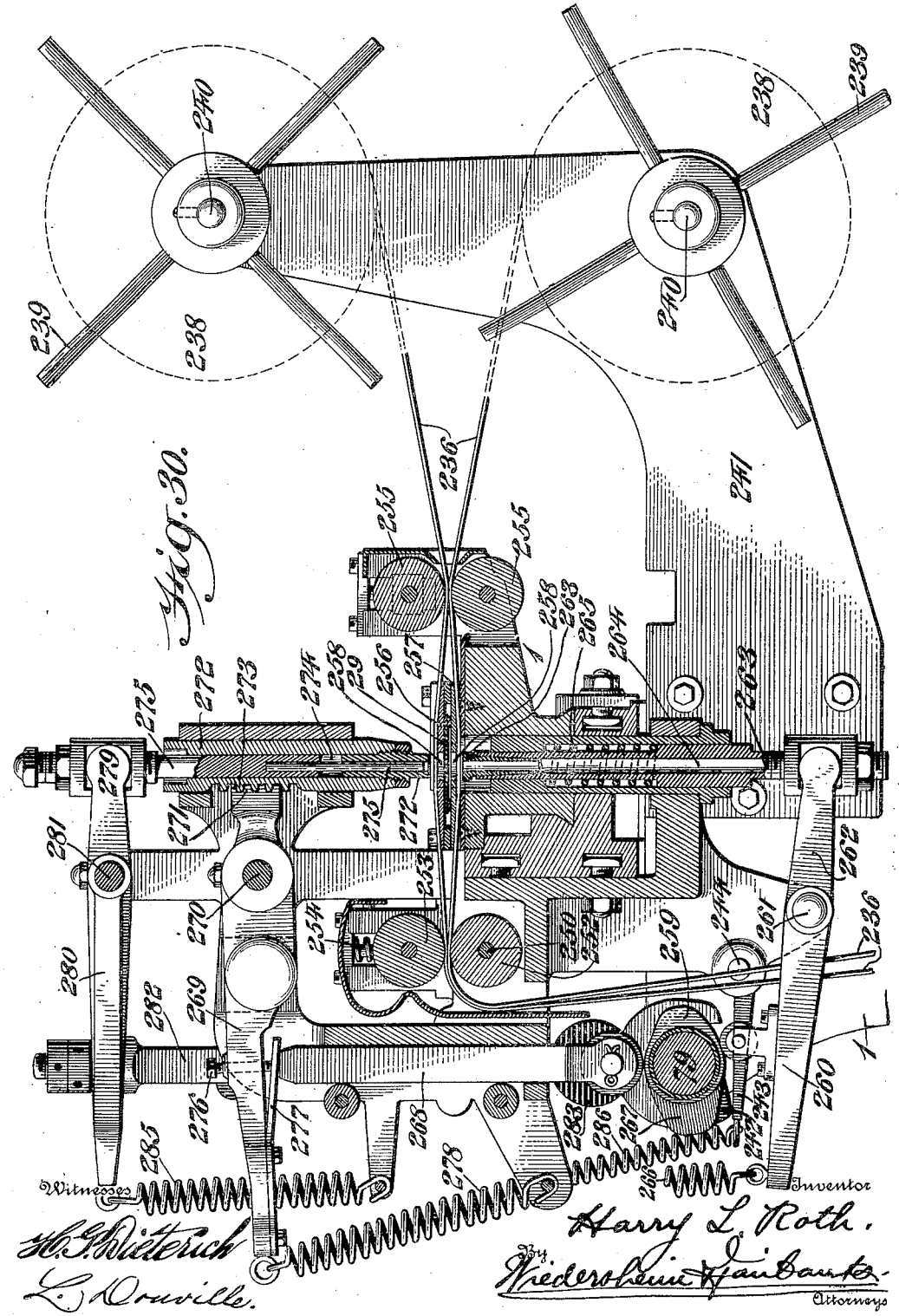

H. L. ROTH.
TAG MACHINE.
APPLICATION FILED MAY 8, 1909.
971,927.
Patented Oct. 4, 1910.
17 SHEETS—SHEET 14.
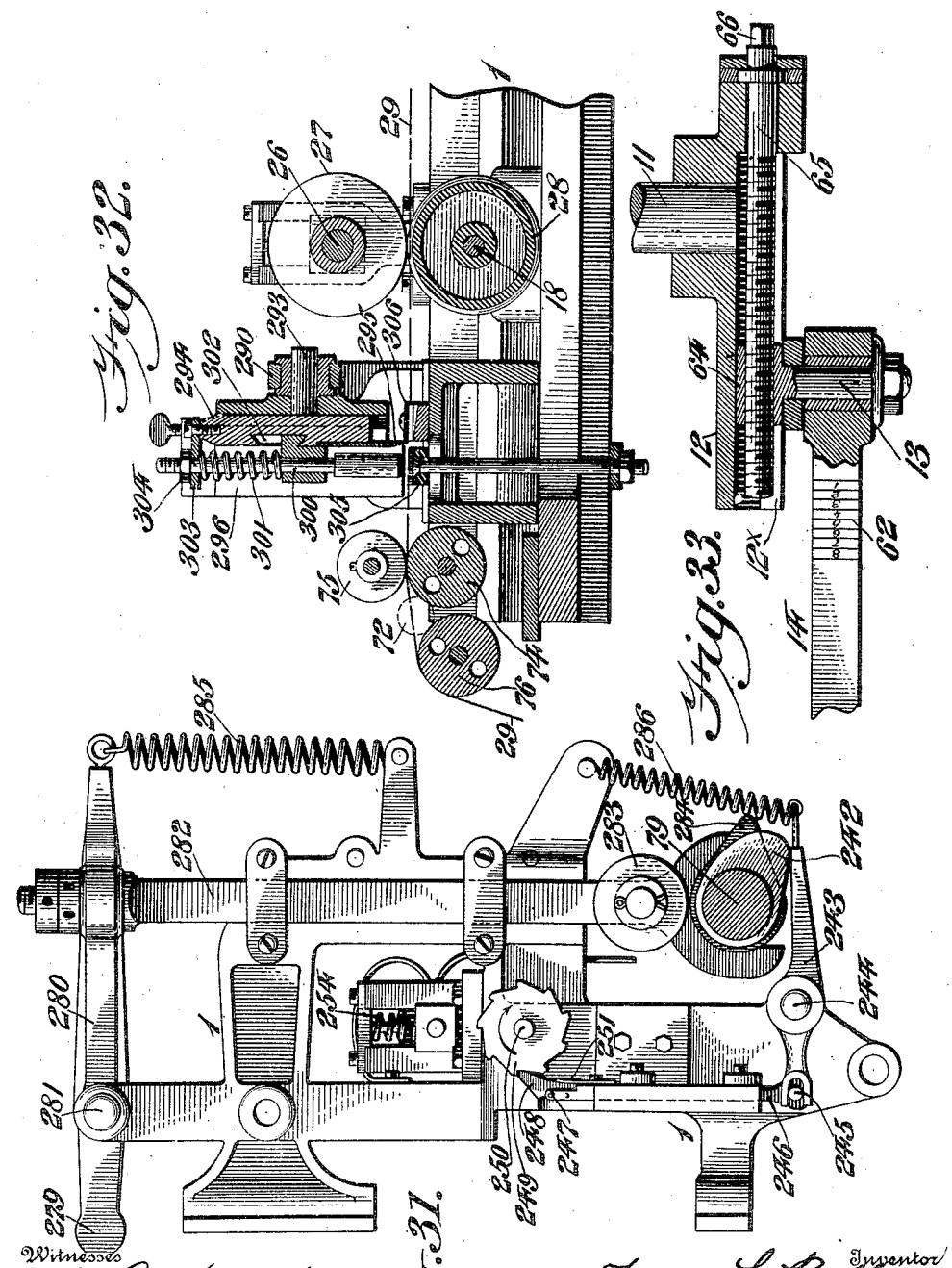

H. L. ROTH.
TAG MACHINE.
APPLICATION FILED MAY 8, 1909.
971,927.
Patented Oct. 4, 1910.
17 SHEETS—SHEET 15.
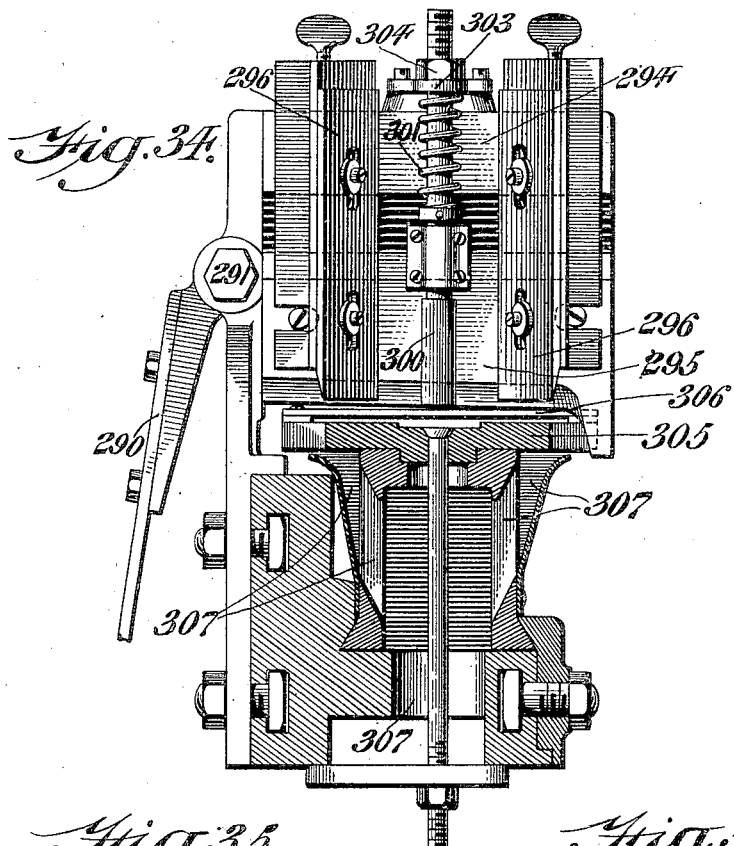
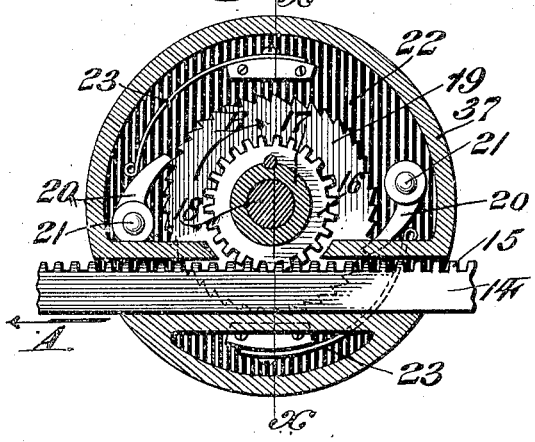
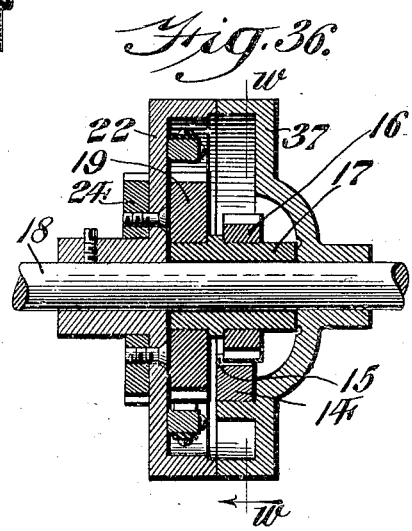

H. L. ROTH.
TAG MACHINE.
APPLICATION FILED MAY 8, 1909.
971,927.
Patented Oct. 4, 1910.
17 SHEETS—SHEET 16.
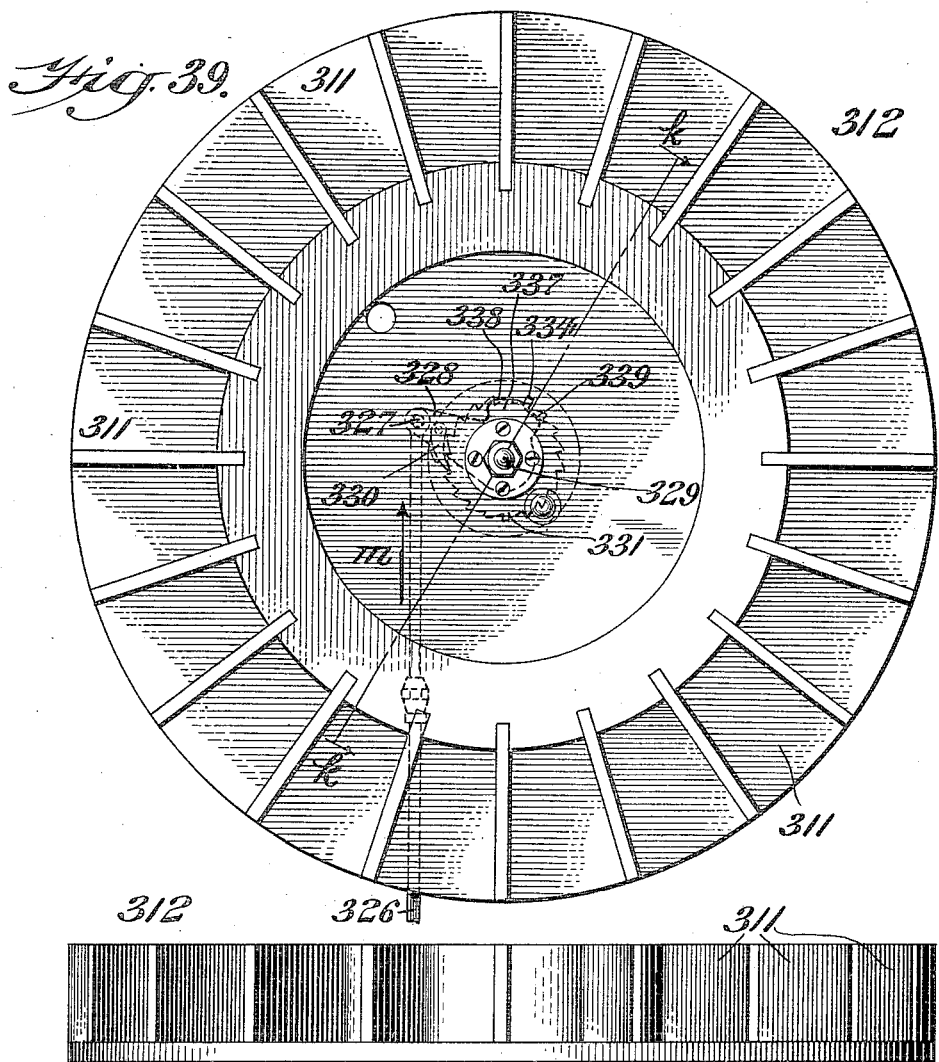
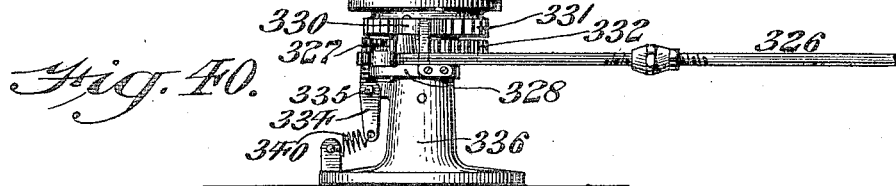
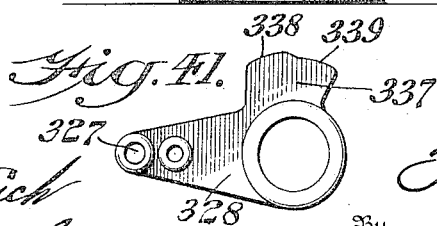

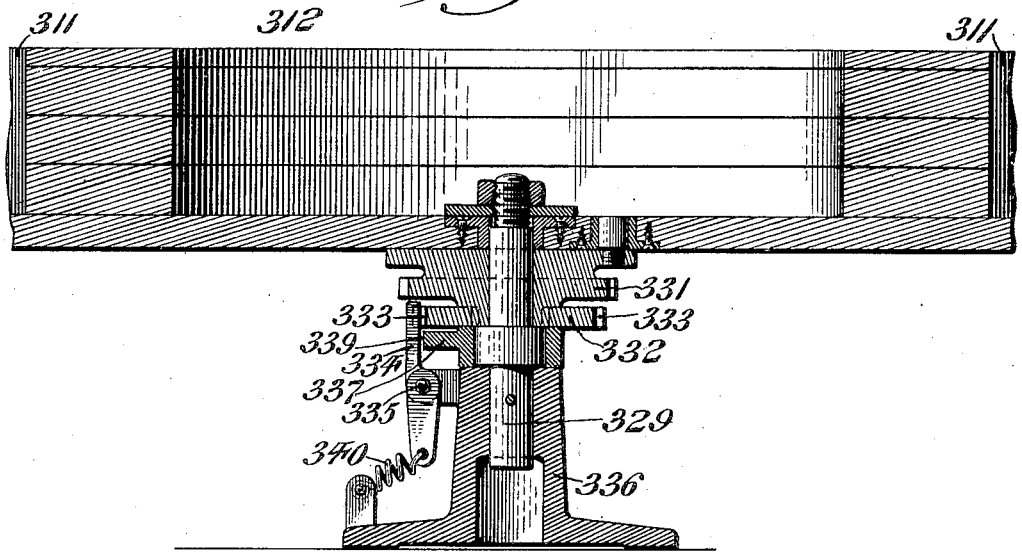
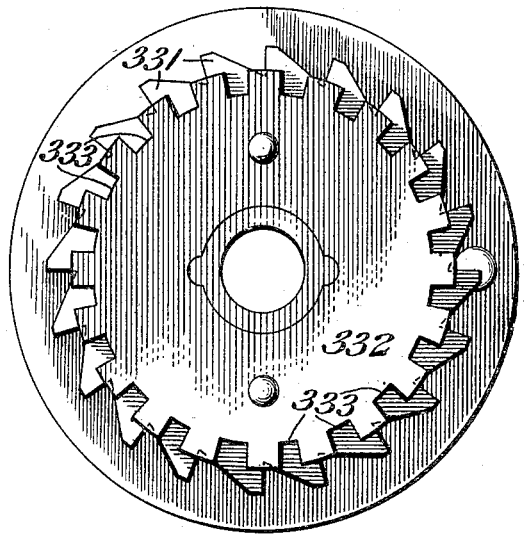

UNITED STATES PATENT OFFICE.

HARRY L. ROTH, OF PHILADELPHIA, PENNSYLVANIA, ASSIGNOR TO INDUSTRIAL EQUIPMENT COMPANY, OF PHILADELPHIA, PENNSYLVANIA, A CORPORATION OF DELAWARE.

TAG-MACHINE.

971,927.      Specification of Letters Patent.      Patented Oct. 4, 1910.

Application filed May 8, 1909. Serial No. 494,882.

*To all whom it may concern:*

Be it known that I, HARRY L. ROTH, a citizen of the United States, residing in the city and county of Philadelphia, State of Pennsylvania, have invented a new and useful Tag-Machine, of which the following is a specification.

This invention relates to a machine for making tags and has for an object the forming of a complete tag provided with the usual reinforced stringing hole and printed or labeled for use from a continuously fed strip of material.

My invention further consists of a novel feeding and guiding means for the strip of material forming the blanks for the tags, the same being so assembled and correlated to the several operations of the machine as to advance and check the blank material at a predetermined time in the cycle of operation.

It further consists of a mechanism for distributing adhesive fluid to the blank strip of material, the same being applied on both sides of the strip and in quantity sufficient for the purpose of uniting reinforcing members thereto, but insufficient to flow over adjacent parts of the material to render the same inoperative.

It still further consists of a punching and clamping mechanism, whereby a piece of reinforcing material is cut from an auxiliary supply strip, positioned upon the blank on opposite sides thereof and coincident with the previously applied adhesive fluid, and then pressed or clamped sufficiently long thereupon to insure a permanent uniting of the parts.

It further consists of a printing mechanism operating in conjunction with the aforesaid parts and by means of which any desired or suitable characters, names or advertising matter may be placed upon the blanks and in position to appear correctly upon each tag after it has been formed.

It further consists of a novel arrangement of cutters whereby the blank strip is stamped or formed into a plurality of tags of usual configuration.

It further consists of an adjusting means for regulating the size and shape of the finished tags and by which it is possible to vary the length or width of the tag at the will of the operator.

It further consists of a counting device operating as a part of the machine, whereby the tags are properly collected after being ejected from the machine and are sorted into stacks containing a desired number, so that it may be determined at a glance or at any time just how many tags have been produced.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 9:
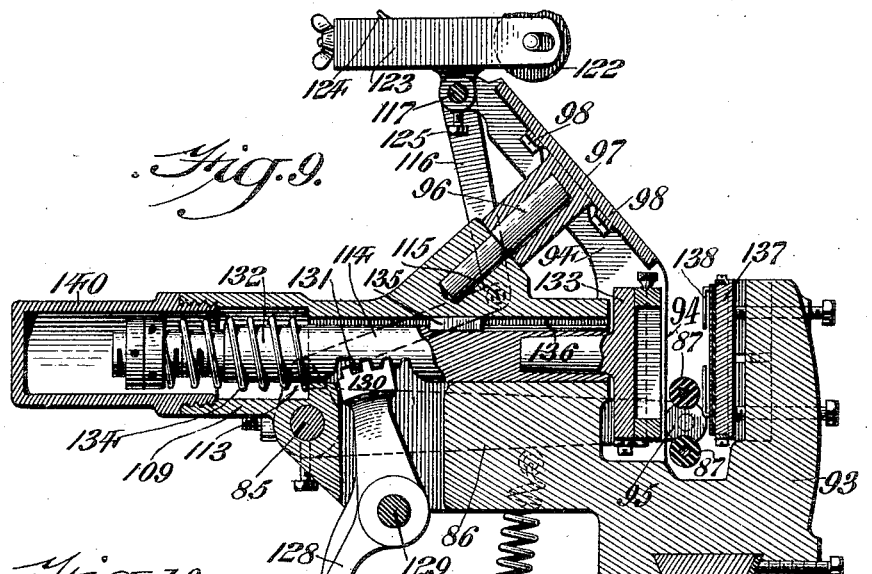
Figure 10:
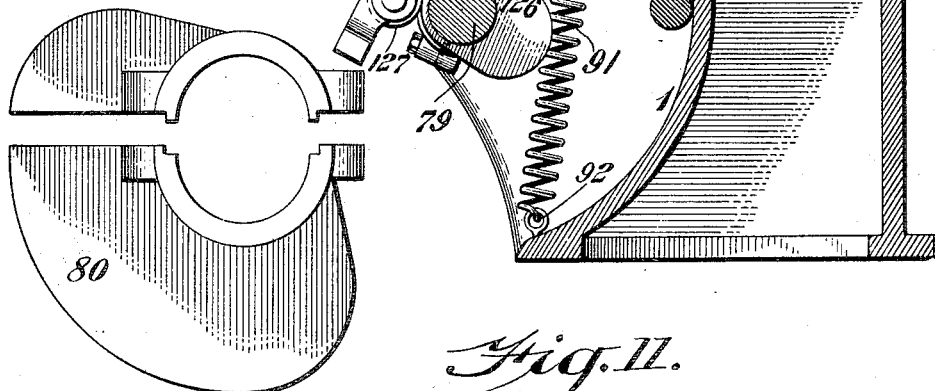
Figure 11:
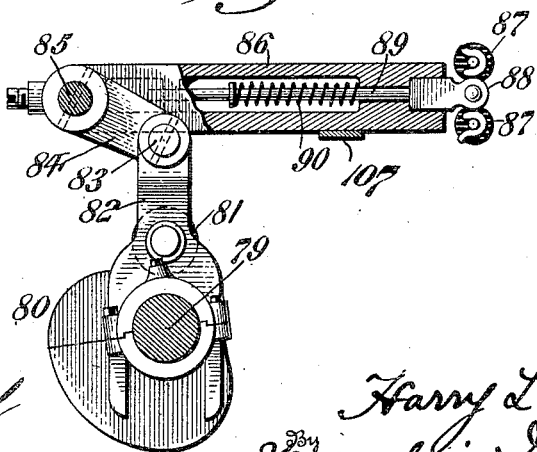

Figure 1 represents a side elevation of the left hand portion of my novel tag machine. Fig. 1$^a$ represents a side elevation of the right hand portion of the machine, it being understood that when said Figs. 1 and 1$^a$ are in longitudinal alinement, they constitute a complete side elevation of the machine. Fig. 2 represents a plan of the left hand portion of the machine on an enlarged scale. Fig. 2$^a$ represents a plan of the central portion of the machine on the same scale as in Fig. 2. Fig. 2$^b$ represents a plan of a portion of the machine lying between the parts seen in Figs. 2$^a$ and 2$^c$, on the same scale as in Fig. 2. Fig. 2$^c$ represents a plan of the right hand portion of the machine and drawn to the same scale as in Fig. 2, it being understood that when said Figs. 2, 2$^a$, 2$^b$ and 2$^c$ are in longitudinal alinement they constitute a complete plan view of the machine. Fig. 3 represents a plan of a finished tag. Fig. 4 represents an end elevation of certain portions of the machine. Fig. 5 represents an end elevation of certain portions of the printing device. Fig. 6 represents a side elevation of certain of the parts seen in Fig. 5. Fig. 7 represents a vertical section on line $m$—$m$ in Fig. 8. Fig. 8 represents a horizontal section on line $n$—$n$, in Fig. 7. Fig. 9 represents a vertical section on line $p$—$p$ in Fig. 2$^b$. Fig. 10 represents a detail view of a cam employed. Fig. 11 represents a side elevation, partly in section, of certain detached portions of the machine. Fig. 12 represents a side elevation, partly in section, of certain detached portions of the machine, the section being taken on line q—q, in Fig. 2ª. Fig. 13 represents a perspective of a chase employed. Figs. 14, 15 and 16 represent details of certain detached portions of the machine. Fig. 17 represents a side elevation, partly in section, of certain detached portions of the machine, the section being taken on line r—r in Fig. 2ª. Fig. 18 represents a side elevation, partly in section, of certain detached portions of the machine. Fig. 19 represents a transverse section of an inkwell employed. Fig. 20 represents a transverse section on line y—y in Fig. 17. Fig. 21 represents a vertical section on line s—s in Fig. 2. Fig. 22 represents a side elevation of certain detached portions of the machine. Fig. 23 represents a side elevation, partly in section, of certain detached portions of the machine. Fig. 24 represents an inverted plan of a receptacle for the adhesive material. Fig. 25 represents a vertical section of a portion of the receptacle seen in Fig. 24. Fig. 26 represents a horizontal section on line t—t in Fig. 25. Fig. 27 represents a perspective of a cam employed. Fig. 28 represents a plan of a portion of the upper surface of a tag with adhesive material applied thereto. Fig. 29 represents a plan of the underside of a portion of a tag with adhesive material applied thereto. Fig. 30 represents a vertical section of line u—u, Fig. 2. Fig. 31 represents a side elevation, partly in section, of certain detached portions of the machine. Fig. 32 represents a side elevation, partly in section, of the left hand portion of the machine. Fig. 33 represents a plan partly in section, of certain portions of the adjusting device for regulating the various lengths of tags. Fig. 34 represents an end elevation, partly in section, of the cutting device, the section being taken on line v—v, Fig. 2. Fig. 35 represents a vertical section of certain detached portions of the machine and taken on line w—w in Fig. 36. Fig. 36 represents a vertical section on line x—x in Fig. 35. Fig. 37 represents a side elevation of certain detached portions of the machine. Fig. 38 represents a plan view of certain of the parts seen in Fig. 37. Fig. 39 represents a plan view, on an enlarged scale, of the receptacle for the finished tags and certain portions of the mechanism that coöperate with said receptacle. Fig. 40 represents a side elevation of the parts seen in Fig. 39. Fig. 41 represents a plan view of a cam and lever employed. Fig. 42 represents a vertical section on line k—k, Fig. 39. Fig. 43 represents a plan view of the under side of certain of the parts seen in Fig. 42, on an enlarged scale. Fig. 44 represents a side elevation of certain detached portions of the machine.

Similar numerals of reference indicate corresponding parts in the figures.

Referring to the drawings: 1 designates the frame of a novel tag machine in which is journaled the main driving shaft 2 provided with the loose and fast pulleys 3 and 4 respectively, it being noted that said shaft 2 has fast thereon the hand wheel 5 and a bevel gear 6, which latter is indicated in dotted lines in the right hand portion of Fig. 2ª. The bevel gear 6 meshes with a similar gear 7 fast on a counter-shaft 8 journaled in the frame 1, it being noted that said shaft 8 is furthermore preferably provided with a spur gear 9 keyed or otherwise secured thereon and which meshes with a gear wheel 10 fast on a shaft 11, also journaled in the frame 1 of the machine. It will therefore be clear that rotation of the shaft 2 transmits motion through the medium of the bevel gears 6 and 7 to the counter-shaft 8 and thence by gears 9 and 10 to shaft 11. The shaft 11 carries thereon an arm 12 suitably mounted for rotation therewith and provided with slot $12^x$ adapted to receive a wrist pin 13 or the like, which forms a bearing for one end of a rod or link 14. The other end of said rod 14 has a rack 15 formed thereon and adapted, when in operative position, to mesh with a pinion 16 keyed or otherwise secured to a sleeve 17 (see Fig. 36) loosely mounted on a shaft 18. It should be noted in the present instance that the rack end of the rod 14 is supported and guided in a flanged disk 37 (see Fig. 35) which is loose on the shaft 18, whereby said disk 37 is free to rock on the shaft 18 in a manner corresponding to the reciprocating motions of the rod. The sleeve 17, as here shown, carries a ratchet wheel 19 keyed or otherwise secured for rotation therewith and adapted to coöperate with a pawl or plurality of pawls 20 mounted on suitable pivots 21 attached to the pulley 22. These pawls 20 are normally held in engagement with the teeth of the ratchet 19 by means of springs 23 or the like.

24 designates a gear wheel secured to the pulley 22 and meshing with a gear 25 fast on a shaft 26, the latter being suitably mounted adjacent shaft 18 and carrying thereon a plurality of feed rolls 27, as shown in Fig. 2. These feed rolls 27 coöperate with other feed rolls 28 so as to exert a pull on a strip 29 of paper or other material. The gear wheel 24 meshes with a gear wheel 25 fast on a shaft 26, whereby an intermittent rotary motion is imparted to said shaft 26 and consequently to the feed rollers 27 fast thereon, and as best seen in Figs. 2 and 32, it being noted that said feed rollers 27 coöperate with the feed roller 28 so as to exert a pull on a strip 29 of material, from which tags are made, and as best seen in Figs. 1 and 1ª, it being noted that said strip 29 is drawn from a roll 30 supported on a reel 31 journaled in the present instance in the post or standard 32.

Pivotally mounted on the frame 1 of the machine, as at 33, is a plate 34 (see Fig. 2°) which has mounted therein preferably a plurality of tension rollers 35 and 36, between which the strips 29 pass after leaving the roll 30. The frame 1 has fitted thereon plates 38 and 39, preferably adjustably arranged and it will be noted that the plate 38 has journaled therein the tension rollers 40, while the plate 39 carries similarly mounted tension rollers 41, it being observed that the rollers 40 are each provided with a ratchet wheel 42, with each of which a check pawl 43 engages in order to prevent improper backward rotary movement of the said tension rollers 40 and 41. In order to permit ready adjustment of the plates 38 and 39, whereby the degree of tension of the rolls 40 and 41 may be raised as desired to suit different requirements, I provide bolts 44 passing through suitable slots 45 in the said plates, it being of course apparent that a loosening of the bolts 44 permits of shifting one plate relative to the other.

46 designates a carriage mounted in ways 47 of the main frame 1 and adapted to be moved longitudinally of the length of the machine, as occasion demands, the same being locked in any position by means of bolts 48 or the like. Coöperatively connected to the carriage 46 is a cross-head 49 having journaled therein tension rolls 50 and 51, preferably inclined at an angle of substantially forty-five degrees (45°) from the plane of the rolls 40 and 41. One of these rolls, as 50, is provided with a ratchet wheel 52 controlled by a check pawl 53, whereby improper rearward rotary movement is prevented.

54 designates a standard preferably mounted for sliding movement in the ways 47 and in which are journaled suitable tension rolls 55 and 56 adapted to receive between them the strip 29 of paper or other material from which the contacts are made. By mounting the standard 54 within the ways 47, adjustment longitudinally of the frame is permitted and therefore the rolls 55 and 56 may be located relatively to certain printing devices, hereinafter referred to.

Referring to Fig. 2ª, 57 designates a plurality of bars secured to the frame 1 and each provided with a slot 58, whereupon a suitable bearing is provided for guide rolls 59, in the periphery of each of which is a circumferential groove 60 adapted to receive the edges of the strip 29 of the paper or the like, it being understood that the slots 58 permit adjustment of the rolls 59 in order to properly guide the strip 29 during its travel through the machine. In order to prevent improper unrolling of the strip 29 from the roll 30 at times when the feeding rolls are not in operation, I preferably provide a spring 61, (see Fig. 1ª) adapted to contact with the roll 30 and by the pressure thereof act as a brake except when the tension is overcome by the operation of the machine. In order to impart a feeding movement to the strip 29 the pulley 22 is provided with a belt 67 seen in Fig. 2, and connected to a pulley 68 which is fixedly secured to a suitably supported shaft 69, the latter operating a series of gears 70, 71, 72 and 73 controlling movement of the feed rolls 74 and 75 and the coöperating guide roll 76, as will be hereinafter described.

*The adjusting devices for the paper feeding mechanism.*—Referring to Figs. 1 and 2 and more particularly to Fig. 33, it will be seen that the rod 14 is provided with a scale or index 62 which is preferably located adjacent the wrist pin 13, as before described. The function of this scale is to determine the amount of adjustment necessary for the rod 14 relative to its operating parts so that the feed may be accurately moved for varying lengths of tags which are being cut. This adjustment is permitted by attaching to the wrist pin 13 a block 64 having screw threaded engagement with a rod 65 suitably mounted in the bore $12^{\times}$ of the arm 12, the said rod having a squared portion 66 in order to permit a wrench or key to be fitted thereto.

*The printing mechanism.*—Referring to Figs. 1ª and 2°, the main driving shaft 2 has fixedly mounted thereon a pinion 77 meshing with a gear 78 fast on a shaft 79, which latter is journaled in the frame 1 of the machine. 80 designates a cam secured to shaft 79, (see Fig. 11) and adapted to coöperate with a roller 81 mounted on a forked link 82. This link 82 carries a pivot pin 83 which is in the present instance attached to one end of a lever, the latter being fixed to a shaft 85 having arms 86 mounted thereon adapted to carry brackets 88 for supporting inking rollers 87. The brackets 88 are each connected to a rod 89 mounted for sliding movement in the arms 86 and normally held, as indicated in Fig. 11, by means of a spring 90 or the like. A spring 91 is secured at one end to one of the arms 86 and the other end is jointed to a fixed portion of the machine as shown at 92. 93 designates a printing press frame carried by a main frame 1 (see Fig. 9) said frame 93 having ways or guides 94 formed thereon and projecting upwardly in order to form a support for rollers 95, which are rotatably mounted upon the brackets 88 and serve to permit free swinging movement of the arms 86. The shaft 85 which carries the arms 86 it will of course be understood is mounted in the printing press frame 93 in order for correct coöperation of the several parts. 96 designates a spindle suitably mounted in the frame 93 and having attached thereto an inking table or disk 97, on the under side of which in the present instance is a plurality of ratchet teeth 98 adapted to be engaged by a dog or pawl 99 in order that the table 97 may be properly rotated in order to present a new inking surface to the rollers 87. The pawl 99, in the present instance, is mounted upon a pin 100 secured to a bell crank lever 101, whereby free pivotal movement of the pawl 99 is permitted as the actuating mechanism comes into operation. This bell crank 101 is preferably journaled in a suitably mounted stud bearing 102 having a pivotal connection 103 with a rod 104, which is attached by suitable means 105 to a bracket 106. Adjacent the bracket 106 and having a bearing thereon is an arm 107 preferably secured to one of the arms 86 for movement therewith and it will be noted that proper movement of the rod 104 is permitted by a bracket 108 secured to the housing 109 forming a part of the printing press frame 83. 110 designates a stop fixedly mounted upon the rod 104, between which and the bracket 108 is a spring 111, the normal tendency of which is to raise the rod 104 and thus operate the pawl 99. It will be apparent that a shifting of the arm 86 to raise the inking rollers carries the arm 107 away from the bracket 106, whereupon the spring 11 immediately actuates the rod 104, the upward movement of which is limited by a fixed stop 112 properly positioned therein and the downward movement of the arm 107 on the return of the lever arms 86 picks up the bracket 106 and returns the parts to normal position for the pawl 99 to engage another tooth of the ratchet 98. 113 designates a lever fixedly mounted upon the shaft 85, the said lever having attached thereto a member 114 pivoted at 115 to a lever 116 loosely mounted on a rod 117, which latter is preferably mounted in the guides 94 of the press frame 93. 118 designates a pin secured to a lever 119 and a pawl 120 movably mounted thereon, the pawl 120 being adapted for engagement with a ratchet wheel 121 fixedly mounted on a shaft carrying an inking roller 122. This inking roller 122 is so mounted as to project into an ink well 123. In order to maintain the pawl 120 in operative engagement with the ratchet wheel 121 a suitably mounted spring 124 is employed. The ink well 123 is suitably secured to the ratchet 117 and in the present instance fixed thereon by means of a set screw 125 or the like.

Referring to Fig. 9, the shaft 79 preferably has fast thereon a cam 126 which coöperates with a roller 127 suitably mounted on a lever 128 loosely fitted on a shaft 129 and provided in its upper portion with the rack teeth 130. These rack teeth 130 are adapted to mesh with similar teeth 131 in a rod or spindle 132 so as to impart a reciprocating motion thereto and consequently simultaneously operate a chase 133 carried thereby. After a movement of the lever 128 to advance the rod 132 to effect a printing of the strip 29, a return of the parts to normal position is made possible by a spring 134 or the like. It will thus be apparent that one stroke, the working one, is made by the movement of cam 126 into engagement with roller 127 while the return stroke is made by the expansion of spring 134. The rod 132 is preferably provided with a key 135 adapted to slide in a longitudinal groove 136 in the printing press frame 93, whereby said rod 132 is prevented from turning during the reciprocating movement. The printing frame 93, in the present instance, has fitted therein a platen 137 which coöperates with a form placed in the chase 133, it being understood of course that suitable guide means, as the clips 138, are provided for the strip of paper 29 in its travel between the platen 137 and chase 133. The rod 132 is preferably inclosed in a housing 109 secured to the frame 93 by a screw cap 140, whereby said rod and certain of the parts that coöperate therewith are, to a certain extent, dust proof.

Referring now to Figs. 12 and 17, 142 designates a cam fixedly secured to the shaft 79 and positioned to engage a roller 143 journaled in the present instance, in the lower portion of a shift bar 144 mounted for sliding movement in the main frame 1 in order to allow reciprocation thereof to operate adjacent parts now to be described. 145 designates a yoke preferably provided with a threaded shank or stem 146 which is adapted to unite said yoke to the shift bar 144 so that as the shank 146, and consequently the yoke 145, move up and down in unison with the shift bar 144 in order to rock the attached levers 147 on their fulcrums 148, as will be understood from Fig. 12. One of the levers 147, in the present instance, has pivoted therein a pawl 149 normally in engagement with a ratchet wheel 150 in order to impart rotary motion thereto when operated by the yoke 145. The ratchet wheel 150 is preferably mounted on a shaft carrying an inking roller 151, seen in Figs. 17 and 19 so as to apply ink from a well 152, in which the roller 151 is located, to the inking roller 153 journaled in the levers 147, it being understood that a rotary motion is imparted to said roller 153 by any suitable means, as a pawl 154 mounted to engage a ratchet wheel 184 fast on the shaft 155, seen in Fig. 2ᵃ. 157 designates a segment lever pivotally mounted at 158 to a press frame 159 and having a bearing at one end through the medium of a flat spring 156, with the shift bar 144. The tension of the spring 156 may be adjusted by any well known means, as for instance the bolt 156ˣ. One end of the segment lever 157 is formed with gear teeth 160 adapted to mesh with rack teeth 161 cut in the shank 162 of the chase 163. It will thus be apparent that rotation of the cam 142 causes a reciprocation of shift bar 144, which transmits a rocking motion to the lever 157, resulting in a reciprocation of shank 162 and chase 163. The stem 162 is preferably provided with a spring 164 which returns it and certain of the parts that coöperate therewith, to their normal positions, it being noted that a longitudinal groove 165, in the present instance, is cut in the said stem 164 for coöperation with a key 166 fast in a housing 167 forming a part of the printing press frame 159 and which housing is provided with a screw cap 168 in order to inclose certain parts of the printing device and thus, to a certain extent, exclude dust therefrom. The frame 159, in the present instance, has journaled therein a shaft 169 carrying thereon a lever 170, seen in Fig. 12, which coöperates with a cam 171 fast on the shaft 79 in order to rock said shaft 169 at certain times and thus transmit motion to a lever 172 also carried by shaft 169 (best seen in Fig. 17). This lever 172 is provided with rack teeth 173 in the upper portion thereof adapted to mesh with a rack bar 174, which is guided in the printing press frame 159 and is free to slide therein so as to cause the inking rollers 175 to apply ink to a form secured in the chase 163. The shaft 79 (seen in Fig. 12) also preferably carries a cam 176 adapted to coöperate with a lever 177, fulcrumed at a suitable point 178 in the printing press frame 159, whereby said lever 177, by reason of its engagement with a rod 179, imparts motion to a pawl 180 in engagement with the ratchet teeth 181 fast to the inking table or disk 182, which latter is mounted to rotate in the printing press frame 159, as best seen in Fig. 17. The rod 179 is preferably provided with a spring 185 to return it, the pawl 180 and the lever 177 to their normal positions after being actuated by the cam 176. 183 designates a platen suitably mounted in the press frame 159 and properly positioned to coöperate with the form carried by the chase 163. It will be apparent from the drawings that in the present instance I have inclosed two press frames 159 and their coöperating adjuncts, but as one is merely a duplication of the other I have deemed it unnecessary to give a detailed description of both, since the above description applies equally well to one as the other. Of course it will be understood that I do not wish to be limited to any exact number of printing devices as various conditions may require duplication or elimination, as the case may be.

*The mechanism for applying adhesive material to the strip of paper from which tags are made.*—Referring now more particularly to Figs. 21 to 29, inclusive, it will be seen that the shaft 79 carries a cam 186 which coöperates with a lever 187 suitably fulcrumed, in the present instance at 188 in the bracket 189, this latter being supported preferably by the frame 1. One arm 190 of the lever 187 is extended a sufficient distance to contact with a lug 191 projecting from a reservoir 192 adapted to contain a suitable adhesive material, said receiver 192 being mounted in ways 193 of the bracket 189 so as to move up and down therein for a purpose hereinafter described. The reservoir 192 in the present instance has journaled therein a spindle 194, to the upper portion of which is fixedly secured an arm 195, coöperating with which is a screw threaded member 196 provided with a head 199, for a purpose to be presently described. The outer extremity of the arm 195 is preferably in contact with a spring strip 197, the function of which is to return the arm 195 to normal position, while suitable stops 198 are located upon either side of the arm 195 in a position to prevent an excessive movement of the said arm 195 in either direction. 200 designates the working face of a cam block 201 (see Fig. 27) which is preferably fixedly mounted upon the bracket 193 in the path of movement of the head 199 and with which it normally contacts to hold the arm 195 against the tension or spring 197. It will be apparent that if the reservoir 192 is raised as heretofore described, the head 199 will be removed from the cam block 201, whereupon the spring 197 rotates the spindle 194 until the arm 195 contacts with one of the stops 198 and on the return or downward movement of the reservoir 192, the head 199 engages the cam face 200 and is thereby shifted to its former position. The lower extremity of the spindle 194 has secured thereto, in the present instance, a disk 202 provided with radial slots or openings 203 adapted to register at certain times with openings 204 radially cut in the bottom of the reservoir 192. The ways or guides 193 preferably have depending therefrom fingers 206ˣ under which passes the strip of paper 29, whereby the latter is prevented from upward movement or sticking to the bottom of the reservoir 192 after adhesive material has been applied thereto and when the reservoir is removed from its contact with said strip of paper 29. 205 designates a reservoir for adhesive material suitably supported in the frame 1, in the present instance being located beneath the paper 29, and it will be noted that said reservoir 205 has journaled therein a shaft 206 to which is keyed or otherwise secured a head 207, best seen in Fig. 23, and provided with radial passages or conduits 208 and openings 209, terminating preferably in the nozzle 210, which latter are each provided with a bore 211 located in alinement with its respective passage or conduit 208 in the head 207. The reservoir 205 has secured thereto a strip 212 which serves as a wiper to remove the surplus adhesive material from that portion of the nozzles 210 which contact with the strip of paper 29. In order to rotate the head 207 and bring the nozzles 210 successively into operative position, the shaft 206 has fast thereon a ratchet wheel 213 and disk 214, the latter preferably having in its periphery a series of grooves 215 for coöperation with a check pawl 216 pivoted at 217 to the reservoir 205, as seen in Fig. 21, the said pawl being retained in contact with the cam face 219 by the tension of a spring 230. The shaft 206 has loosely fitted thereon an arm 218 provided with a cam face 219 for coöperation with the check pawl 216, so as to cause the latter, at certain times, to lock the disk 214 against rotation. Suitably pivoted as at 220, to the arm 218 is a pawl 221 positioned for engagement with the teeth in the ratchet wheel 213, so as to impart motion thereto, and it will be noted that this pawl 221 is retained in contact with the ratchet wheel 213 by a spring or equivalent device 222. The reservoir 205 has pivoted thereto at 223 a check pawl 224, which coöperates with the disk 214 to lock the latter against reverse movement, a spring 225 or the like, being provided to retain the parts in operative position. The arm 218, in the present instance, is provided with a lug or extension 226 which is normally held against a stop 227 projecting from the reservoir 205 by means of a spring 228 under tension from a fixed point 229 on the frame 1. It will thus be clear that movement of the arm 218 against the tension of spring 228 carries the pawl 221 to rotate the shaft 206 and bring a nozzle 210 in correct operative alinement. The movement of the nozzle 210 is determined by the dropping of pawl 216 from the cam face 219 to the periphery of ratchet wheel 214, where it engages the next approaching groove 215 to put an end to the movement of the parts at the proper time in the cycle of operations. In order to effect movement of the arm 218 I preferably mount on the link or bar 14 a block 231, having in the present instance an integral slotted bracket 232, by means of which the parts are adjustably supported on the frame 1, through the medium of a bolt or pin 233. Suitable set screw devices 234 serve to maintain the block 231 firmly in position on the bar 14. It will of course be understood that an opening 235 or the like is provided in the reservoir 192 for the purpose of supplying adhesive fluid thereto.

*Mechanism for feeding and punching the strips of material from which the reinforcing washers are made.*—Referring now to Figs. 30 and 31, 236 designates strips of material from which the eyelets 237 are made, the said strips being fed preferably from the rolls 238 supported in the reels 239 journaled on the shafts 240 carried by the brackets 241 of the frame 1. The shaft 79, heretofore described, has fast thereon a cam 242 (see Fig. 31) positioned to operate a lever 243 fulcrumed at 244 in the frame 1, it being noted that said lever has coupled thereto at 245 the one extremity of a bar 246, on the opposite end of which is preferably pivoted at 247 the dog or pawl 248. This pawl 248 serves to actuate a ratchet wheel 249 secured to a shaft 250 journaled in the frame 1, it being noted that the pawl 248 is retained in contact with the ratchet wheel 249 by a spring 251 or the like. The shaft 250 carries thereon, for rotation therewith, a feed roller 252 (seen in Fig. 30) coöperating with which is a second feed roller 253, journaled in the frame 1 and held against either the roller 250 or the strips 236, in the present instance by the tension of the springs 254, the function of these rollers being to feed the strips 236. 255 designates suitable guide rollers journaled in the frame 1 in position to carry the strips 236 to the punch mechanism hereinafter described. It will be noted that one strip 236 is passed over a plate 256 while the other strip 236 is passed under the plate 257, the two plates 256 and 257 each being provided with an opening 258 and the object of all of which is hereinafter described. A spring or equivalent device 286 serves to return the lever 243 to normal position. 259 designates another cam mounted on shaft 79 and positioned to operate a lever 260, fulcrumed at 261 in the frame 1, the said lever 260 by reason of the engagement of an arm 262 with a punch 263, imparts a reciprocating motion thereto in unison with the rocking of the lever 260 under the action of cam 259. The punch 263 is provided with a bore 264 for a purpose later described and at the upper extremity or cutting portion registers with the opening 258 in the plate 257. The punch 263 and the lever 260 are preferably returned to their normal positions by the co-acting springs 265 and 266 respectively. 267 designates a cam fixedly mounted on shaft 79 and positioned for coöperation with a bar 268 slidingly mounted in the frame 1, whereby the lever 269 may be rocked on its fulcrum 270, and by reason of a segmental rack 271, formed thereon, may impart motion to a punch 272 guided in the frame 1, it being observed that the teeth in the rack 271 are in mesh with the rack teeth 273 of the punch 272. The lower extremity or cutting portion of said punch registers with the opening 258 in the plate 256 and has therein the bore 274 in which latter is guided a second punch 275, free to reciprocate therein, as hereinafter described. The lever 269, in the present instance, has fitted therein a screw 276, the function of which is to adjust the tension of a spring 277 secured to said lever 269, whereupon it is evident that the extent or degree of rocking of said lever 269, due to the reciprocations of the bar 268, may be determined. A spring 278 preferably returns the lever 269 to its normal position. The upper portion of the punch 275 has fitted in a suitable bearing therein the arm 279 of a lever 280 fulcrumed at 281 in the frame 1, it being noted that said lever 280 is operated by a bar 282 provided with a roller 283 positioned adjacent and adapted to contact with a cam 284, (see Fig. 31) fixedly secured on the shaft 79. A spring 285 or the like serves to return the lever 280 to normal position.

*Mechanism for cutting tags from the strip of paper.*—Referring now to Figs. 4 and 34, 288 designates a cam secured to the shaft 79 and adapted to contact with a spring 289 secured to the lever 290 fulcrumed at 291 in the frame 1. It will be noted that the lever 290 has fitted therein a screw 292 bearing against the spring 289 in order to adjust the tension thereof for the proper rocking of the lever 290 by the cam 288. The lever 290 is also preferably pivoted at 293, (Fig. 2) to a cross-head 294 guided in the frame 1, whereupon it is evident that said cross-head 294 is reciprocated by the rotation of the cam 288. This cross head 294, in the present instance, has secured thereto the blades 295 and 296 so positioned relative each to the other as to cut a tag 297 from the strip of paper 29 and along the edges 298 and 299, as will be understood from Fig. 3. The cross-head 294, in the present instance, is provided with a presser foot 300, a portion of which is encircled by a spring 301 whereby said cross-head 294 and the blades 295 and 296 carried thereby are permitted to descend after said presser foot 300 is brought to a stop, it being noted that the cross-head 294 is provided with a groove 302 (see Fig. 32) and a projecting member 303 for this purpose. The presser foot 300 is preferably provided with a nut 304 and threaded portion for proper adjustment relative to a bed or plate 305 secured to the frame 1, it being noted that a guide bar 306 for the strip of paper 29, is located adjacent to the blade 295. That portion of the frame 1 below the blades 295 and 296 is preferably provided with passages 307 through which the triangular pieces cut from the strip of paper 29, when severing a tag 297 from said strip, may drop to the floor or into a receptacle therefor through the chute 308, seen in Fig. 1.

*The counting device.*—Referring to Fig. 1, 313 designates a bevel gear fixedly mounted upon the shaft 79 positioned for meshing engagement with a similar gear 314 mounted upon a shaft 315, suitably journaled in the frame 1 of the machine. This shaft 315 carries thereon a second bevel gear 316 keyed or otherwise secured thereto and meshing with a similar gear 317 fast on an adjacent shaft 318 likewise journaled in the frame 1. 319 designates a worm fixed on the shaft 318 and in position to mesh with a worm wheel 320, which latter is journaled on a standard 321 suitably mounted in the frame 1. The gearing above described is preferably so designed that while one revolution of the worm wheel 320 is taking place the driving shaft 79 has made fifty revolutions. The movement of the worm wheel 320 is transmitted through the medium of a cam 322 fixed thereto and mounted for rotation upon the standard 321 to a lever 323, in the present instance fulcrumed at 324 to the said standard 321. This lever 323 is connected at 325 to a rod 326 which is connected at 327 to a lever 328 loosely mounted on a shaft 329, which is preferably vertically disposed in a standard 336 and carries for rotation therewith a tag receptacle 312. 330 designates a pawl suitably mounted on the lever 328 and in position to coöperate with a ratchet wheel 331 fixedly secured to the tag receptacle and by means of which the latter is rotated at intervals, as desired. Secured to the ratchet wheel 331 is a disk 332, the periphery of which has grooves 333 preferably cut therein (see Fig. 43) and it will be noted that a lever 334 is suitably pivoted at 335 to the standard 336 and normally held by a spring 340 so that one end is held so as to engage one of the grooves 333 of the disk 332. In order to permit at the proper time the movement of the receptacle 311, a cam 337 is preferably mounted upon a shaft 329 and is so formed as to engage the lever 334 so as to swing the same against the tension of the spring 340 and move it out of engagement with the grooved disk 332. It will now be apparent that after the fifty revolutions of the shaft 79 and the consequent placing of fifty tags within the receptacle, 311 that the worm wheel 320 will have been rotated so as to bring the cam member 322 into position to shift the lever 323, rod 326 and the coöperating parts and thereby move the receptacle 311 a distance equal to one tooth of the gear 331 and thereby bring another compartment in position to receive the completed tags. In this way an accurate count may be kept of the number of tags turned out of the machine as each compartment of the receptacle is filled with fifty tags.

*The operation of the feed and the guide rollers for the paper from which tags are made.*—The driving belt 4ª is shifted from the loose pulley 3 to the driving pulley 4 on the shaft 3, whereupon motion is imparted to the latter and consequently to the bevel gear wheel 6 which transmits it to the bevel gear wheel 7, shaft 8 and spur gear 9. This gear 9, by reason of its engagement with the gear 10, transmits motion through the shaft 11 to the arm 12, causing the same to rotate and thereby impart a reciprocating motion to the rack-bar or link 14. When the link 14 is moving in the direction indicated by the arrows "A" in Figs. 2 and 35, a rotary motion is imparted to the gear 16 by the rack teeth 15 in the link 14, causing said gear wheel 16 and ratchet wheel 19 secured thereto to rotate in unison and in the direction indicated by the arrow "B" in Fig. 35, it being understood that the teeth in the ratchet wheel 19 slip under the dogs or pawls 20 during this rotary motion of the ratchet wheel 19 to the shaft 18. When the rack bar 14 is moving in a direction opposite to that indicated by the arrow "A" it causes the gear 16 and ratchet wheel 19 to rotate in a direction opposite to that indicated by the arrow "B," whereupon said ratchet wheel, by reason of its engagement with the dogs or pawls 20, imparts motion to the shaft 18 and causes it to rotate in unison with the ratchet wheel 19. The rotation of the shaft 18 transmits motion to the disk 22 and gear 24 secured thereto. The gear 24, by reason of its engagement with the gear 25 imparts motion to the shaft 26 and consequently to the feed rolls 27 thereon and the feed rolls 28, which coöperate with the feed rolls 27. The pulley 22 imparts motion to the pulley 68 through the belt 67, whereupon the shaft 69 is caused to rotate and consequently impart a rotary motion to the gear 71 and feed rolls 75 on said shaft 69. The gear 71, by reason of its engagement with the gear 70, transmits motion thereto and consequently to the feed roll 74, which coöperates with the feed rolls 75 (seen in Fig. 32). The gear 70, meshes with the idler or pinion 72, which latter by reason of its engagement with the gear 73 imparts motion to the guide roller 76.

*The operation of inserting the strip of paper 29 in the machine.*—Assuming the machine to be in operation, the free end of the strip of paper 29 is withdrawn from the spool 30 and passed between the tension rolls 35 and 36 to the guides 138 on the platen 137, as will be understood from Fig. 9, after which it is passed between the guide rolls 40 and 41. The strip is then passed between the inclined rolls 50 and 51, which turn it from a vertical position to an angle of substantially forty-five degrees and it is next passed between the guide rolls 55 and 56 where an additional turn of substantially forty-five degrees is given and it thus assumes a horizontal position. The edges of the strip are now placed in the grooves 60 in the guide wheels 59, as seen in Fig. 2ª, whereby it is properly directed to the platens 183. After leaving the platens 183 it is passed through the device for applying adhesive material and to the rolls 27 and 28, from which the guide plate 306 directs it under the blades 295 and 296 (see Fig. 34) and presser foot 300 to the main feed rolls 74 and 75.

Referring now to Fig. 2ᶜ it will be seen that the pinion 77 imparts motion to the gear wheel 78 and shaft 79 whereby rotation of the cam 242 imparts motion to the lever 243 and thus causes, through the coöperating parts, an intermittent rotary motion of the shaft 250 carrying the feed roll 252 and with which the roll 253 coöperates. The strips of material 236 from which the reinforcing washers 237 are made are drawn from the rolls 238 and passed between the guide rollers 255, one strip being passed over the plate 256, while the other strip is passed under the plate 257, after which both strips are brought between the feed rolls 252 and 253 and thereby fed intermittently to the punches 263.

It is to be understood that before starting the machine the operator adjusts the position of the wrist pin or pivotal point 13, of the rack bar 14 relatively to the shaft 11 by rotating the screw 65 (see Fig. 33) so that the arm 12 in rotating will impart the desired degree of throw to said rack bar 14, it being apparent that the rotation of the screw 65 to the right or to the left will bring wrist pin 13 nearer to or farther from the shaft 11. The index or scale 62 enables the operator to readily adjust the wrist pin 13 relatively to a predetermined length of tags 297, it being observed that in the present instance the index or scale 62 is adapted to indicate eight sizes of tags, and furthermore that the guide wheels 59, seen in Fig. 2ª, may be brought nearer to or farther from each other in a direction at a right angle to that of the length of the machine, by reason of the slots 58 in the bars 57, whereupon various widths of paper 29 may be passed through the machine.

*The operation of the printing mechanism.*—Referring now to Fig. 11 it will be seen that the cam 80 carried by shaft 79 imparts an upward movement to the link 83, thereby rocking the arms 86 to bring the inking rollers 87 into contact with the inking disk or table 97, it being apparent that the top roller 87 is supplied with ink by the roller 122, journaled in the ink well 123, and applies the same to the disk or ink table 97, whereby both rollers 87 distribute the ink evenly upon said disk 97. The inking rollers 87 apply ink to the type in the chase 133 in the usual manner. An intermittent rotary motion is imparted to the disk or ink table 97 by the cam 80, seen in Fig. 5, it being remembered that said cam is fast on the shaft 79 and consequently elevates the link 82, whereupon the lever 84 and shaft 85 are rocked in unison to elevate the member 107 fast on the shaft 85. The upward movement of the shaft 85 permits the spring 111, see also Fig. 6, to expand and thereby raise the rod 104, producing a rocking of the bell crank lever 101 so that the dog or pawl 99 is brought into engagement with an appropriate ratchet tooth 98 to impart motion to the ink table or disk 97 on the downward movement of the member 107 due to the pull of the spring 91, it being understood that the bracket 106 follows the up and down movements of the member 107. The upward movement of the rod 104 is limited by the stop 112 adjustably fitted thereon.

Referring now to Fig. 9, the cam 126 imparts a rocking motion to the lever 128 and consequently to the rack 130, whereby a reciprocating motion is imparted to the chase stem 132 and chase 133 to thus print the desired characters upon the strip of paper 29.

Referring to Figs. 12 and 17, it will be seen that rotation of the cam 142 imparts a reciprocating movement to the shift bar 144 and yoke 145, thereby rocking the lever 147 so as to operate the inking roller 155 to apply ink to the inking rollers 175. A step by step movement is imparted to the inking plate or disk 182 by the ratchet wheel 181 and pawl 180 by means of the cam 176 and the adjacent coöperating parts. The cam 171 by reason of its rotation, imparts a rocking motion to the lever 170, shaft 169 and lever 172, whereupon the rack 173 in said lever 172, meshing with the rack bar 174, imparts a reciprocating motion to the latter to operate the inking rollers 175 to apply ink to the type in the chase 163. The movement of the shift bar 144 rocks the lever 157, causing its rack 160 to move the stem 162 with the chase 163 and type therein, whereupon the desired characters are printed on the strip of paper 29.

*The operation of the device for applying adhesive material to the strip of paper 29.—* Referring to Fig. 21, it will be seen that rotation of the cam 186 imparts a rocking motion to the lever 187 so that when its member 190 is lowered, the reservoir 192 which contains adhesive material, descends and contacts with the upper surface of the strip of paper 29. The downward movement of the reservoir 192 and spindle 194 journaled therein occurs simultaneously, whereupon the arm 195 and its screw threaded member 196 fast on the spindle 194 descend also and the head 199 contacts with the working face 200 on the cam block 201 and imparts a partial rotation to the spindle 194. This movement is transmitted to the disk 202 on the lower extremity of the spindle 194 and brings the openings 203 therein into register with the openings 204 in the bottom of the reservoir 192, whereupon a portion of the adhesive material is permitted to escape and be applied to the upper surface of the strip of paper 29, as indicated at "G" in Fig. 28. The lever 187, its member 190 and the reservoir 192 are returned to their normal positions by the spring 309, it being apparent that the spindle 194 in moving upward, carries the head 199 out of contact with the cam 201, whereupon a partial rotation is imparted by the pressure of the spring 197 to the spindle 194, thereby turning the openings 203 from their alinement with the openings 204 and thus shutting off the escape of adhesive material from the reservoir 192. Bearing in mind the operating connections of bar 14 and coöperation of the member 232, it will be apparent that if the bar 14, seen in Fig. 22, is moving from right to left, the stud 233 is brought in contact with the lever 218 and the latter will therefore be carried along with said stud and thus impart a partial rotation of the shaft 206. This movement of lever 218 also withdraws the cam face 219 and permits the check pawl 216 to drop while the disk 214 is turning so that at the proper moment said pawl 216 engages a recess 215 in the periphery of said disk and temporarily locks the latter against rotation. Assuming that the reservoir 205, (see Fig. 23) is supplied with adhesive material to approximately half its depth, it is apparent that a portion of said material is carried around by the reinforcing washers 210 during the rotation of block 207. The superfluous adhesive material on the reinforcing washers 210 is removed by the strip or wiper 212, and when the reservoir 192 is in its lowermost position, it depresses the strip of paper 29 and thus brings the underside thereof in contact with a reinforcing washer 210, whereupon adhesive material is applied in the form of a ring, as indicated at "H" in Fig. 29. Portions of the superfluous adhesive material may flow through the passage 211 in each reinforcing washer 210 and then through the passage 208, which registers therewith and finally through an opening 209 back into the reservoir 205. On the back stroke of bar 14 the parts return to normal position, as will readily be apparent.

*The operation of punching and securing the reinforcing washers 237 to the strip of paper 29.—*Referring now to Figs. 30 and 31, the rotation of the cam 267 imparts a rocking motion through the bar 268 so that the rack 271 is shifted to operate the punch 272 and bring it into position to cut a reinforcing washer from the upper strip 236, which reinforcing washer is carried through the opening 258 in the plate 256 and pressed against the upper surface of the strip of paper 29 upon the adhesive material applied thereto. The rotation of cam 259 imparts a rocking motion to the lever 260 so as to swing the member 262 and bring the punch 263 into position to cut a reinforcing washer from the lower strip 236 and carry the same through the opening 258 in the plate 257 and press it against the under side of the strip of paper 29 upon the adhesive material. It will be understood that when the punches 272 and 263 have reached the limit of their operative positions, the portion of the strip of paper 29 which has the reinforcing washers secured thereto as well as the reinforcing washers themselves are firmly clamped between said punches 272 and 263, during which time the punch 275 is lowered and punched out the central opening. It will be understood that the several levers just referred to are returned to their normal positions by their respective springs. It is apparent that the intermittent rotary motion imparted to the feed rollers 252 and 253 will cause said rollers to draw the strips 236 across the strip of paper 29 step by step, so that when said strips 236 and the strip of paper 29 are at rest, the punches are in operation.

*The operation of the device for cutting tags from the strip of paper 29.*—After the punching operation has been accomplished, motion is again imparted to the feed rollers 74 and 75, whereupon the strip of paper 29 is again fed or moved toward the blades 295 and 296 and when the reinforcing washers 237 have reached a point slightly beyond the blade 295, the feeding operation ceases and the blades 295 and 296 are lowered by the coöperation of the lever 290, spring 289 and cam 288. The blade 295 in its descent cuts the strip of paper 29 transversely along the edge 298 in Fig. 3, while the flaring blades 296 cut the strip of paper 29 along the edges 299, thereby removing the corners after which the finished tag 297 is directed by the chute 310, seen in Fig. 1, into a pocket 311 in the receptacle 312, seen also in Fig. 37. The triangular pieces that are cut from the corners of the tags 297 drop into the chute 308 and from thence into any suitable receptacle.

*The operation of the counting device for the tags.*—It will be understood that one finished tag 297 is discharged from the machine and is directed by the chute 310 seen in Fig. 1 into a pocket 311 by one revolution of the shaft 79, so that when the latter is completing its fiftieth revolution, fifty tags 297 have been deposited in a pocket 311, whereupon a projection 342 in the cam 322, seen in Fig. 38, is brought into contact with the lever 323, due to the rotation of said cam and said lever 323 is turned on its fulcrum 324 and moves the rod 326 in the direction indicated by the arrow $m$ in Figs. 1 and 39. This movement shifts the dog or pawl 330 from the tooth in the ratchet wheel 331, with which it was engaged during forty-nine revolutions of the shaft 79 and is now brought into engagement with a tooth immediately following so that when the projection 342 in the cam 322 is removed from its contact with the lever 323, the latter is again returned to its normal position by the pull of the spring 343, thus causing the rod 326 to move in a direction opposite to that indicated by the arrow $m$ in Figs. 1 and 39, whereupon the tag receptacle 312 is turned upon the shaft 329, in the present instance one twentieth of a revolution. Simultaneously with the movement of the rod 326 in the direction indicated by the arrow $m$ in Figs. 1 and 39, the cam face 338 is brought into engagement with the lever 334 and turns the latter on its fulcrum 335 and throws it out of its engagement with a groove 333 in the disk 332, thereby permitting the tag receptacle 312 to be turned on the shaft 329. When the rod 326 is returned to its normal position seen in Figs. 1 and 39, the cam face 338 is removed from the lever 334, whereupon the cam face 339 is brought in the path of said lever and permits the latter to enter a groove 333 in the disk 332 and lock the latter and consequently the tag receptacle 312 against rotation, as will be understood from Fig. 42. The finished tags 297, in lots of fifty, may then be removed from the pockets 311 and disposed of, as may be desired.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, a frame, a spool adjacent thereto carrying a strip of material for making tags, a plurality of rolls mounted on said frame for feeding said strip of material in a straight line along said frame, means to produce a step by step movement of said rolls, a printing press arranged to print on one side of said strip of material, guide rolls angularly disposed with respect to said frame to produce a quarter twist in said strip of material, a plurality of printing presses arranged to print on the opposite side of said strip of material from said first mentioned press, means to operate said presses between the step by step movement of said strip, and means for applying a reinforcing washer to said strip of material.

2. In a device of the character stated, a frame, a spool adjacent thereto carrying a strip of material for making tags, a plurality of rolls mounted on said frame for feeding said strip of material in a straight line along said frame, means to produce a step by step movement of said rolls, a printing press arranged to print on one side of said strip of material, guide rolls angularly disposed with respect to said frame to produce a quarter twist in said strip of material, a plurality of printing presses arranged to print on the opposite side of said strip of material from said first mentioned press, means to operate said presses between the step by step movement of said strip, means for applying a reinforcing washer to said strip of material, and a cutting mechanism for severing said strip of material into predetermined lengths.

3. In a device of the character stated, a frame, a spool adjacent thereto carrying a strip of material for making tags, a plurality of rolls mounted on said frame for feeding said strip of material in a straight line along said frame, means to produce a step by step movement of said rolls, a printing press arranged to print on one side of said strip of material, guide rolls angularly disposed with respect to said frame to produce a quarter twist in said strip of material, a plurality of printing presses arranged to print on the opposite side of said strip of material from said first mentioned press, means to operate said presses between the step by step movement of said strip, means for applying a reinforcing washer to said strip of material, a cutting mechanism for severing said strip of material into predetermined lengths, and means to vary the time of operation of said cutting mechanism.

4. In a device of the character described, a frame, a spool adjacent thereto carrying a strip of material for making tags, a plurality of rolls mounted on said frame for feeding said strip of material, means to produce a step by step movement of said rolls, guides to vary the angular relation of said strip to said frame, a plurality of printing presses arranged to engage opposite sides of said strip, means to operate said presses between the step by step movement of said strip, a step by step mechanism for feeding a reinforcing strip adjacent the path of movement of said tag strip, and means for applying a portion of said reinforcing strip to said tag strip.

5. In a device of the character stated, a frame, a spool adjacent thereto carrying a strip of material for making tags, a plurality of rolls mounted on said frame for feeding said strip of material, means to produce a step-by-step movement of said rolls, guides to vary the angular relation of said strip to said frame whereby said strip may be positioned for printing, a plurality of printing presses arranged to print on opposite sides of said strip, means to operate said presses between the step-by-step movement of said strip, a step-by-step mechanism for feeding a reinforcing strip adjacent the path of movement of said tag strip, a punch operatively mounted in proximity to said reinforcing strip, and means to operate said punch to apply a portion of said reinforcing strip to said tag strip.

6. In a device of the character stated, a frame, a spool adjacent thereto carrying a strip of material for making tags, a plurality of rolls mounted on said frame for feeding said strip of material, means to produce a step-by-step movement of said rolls, guides to vary the angular relation of said strip to said frame whereby said strip may be positioned for printing, a plurality of printing presses arranged to print on opposite sides of said strip, means to operate said presses between the step-by-step movement of said strip, a step-by-step mechanism for feeding reinforcing strips transversely of said tag strip and on opposite sides thereof, and means for applying a portion of each reinforcing strip to said tag strip.

7. In a device of the character stated, a frame, a spool adjacent thereto carrying a strip of material for making tags, a plurality of rolls mounted on said frame for feeding said strip of material, means to produce a step-by-step movement of said rolls, guides to vary the angular relation of said strip to said frame whereby said strip may be positioned for printing, a plurality of printing presses arranged to print on opposite sides of said strip, means to operate said presses between the step-by-step movement of said strip, a step-by-step mechanism for feeding reinforcing strips transversely of said tag strip and on opposite sides thereof, a punch operatively mounted in proximity to each reinforcing strip, and means to operate said punches to apply a portion of each reinforcing strip to said tag strip.

HARRY L. ROTH.

Witnesses:
H. S. FAIRBANKS,
C. D. McVAY.